United States Patent [19]

Akazawa et al.

[11] Patent Number: 5,658,132
[45] Date of Patent: Aug. 19, 1997

[54] POWER SUPPLY FOR VIBRATING COMPRESSORS

[75] Inventors: Naoki Akazawa; Kazuyuki Ogiwara, both of Nitta-machi, Japan

[73] Assignee: Sawafuji Electric Co., Ltd., Tokyo, Japan

[21] Appl. No.: 319,421

[22] Filed: Oct. 6, 1994

[30] Foreign Application Priority Data

Oct. 8, 1993 [JP] Japan ................................ 5-252771
Aug. 11, 1994 [JP] Japan ................................ 6-187191
Aug. 11, 1994 [JP] Japan ................................ 6-189190

[51] Int. Cl.$^6$ ................................................. F04B 49/06
[52] U.S. Cl. ........................ 417/45; 62/132; 318/803; 318/807
[58] Field of Search .................. 417/45, 24, 44.11; 62/126, 132; 363/17, 98; 318/116, 801, 802, 803, 807

[56] References Cited

U.S. PATENT DOCUMENTS

| | | | |
|---|---|---|---|
| 4,672,528 | 6/1987 | Park et al. | 363/98 |
| 4,736,595 | 4/1988 | Kato | 62/160 |
| 4,748,550 | 5/1988 | Okado | 366/98 |
| 5,072,354 | 12/1991 | Katto et al. | 363/98 |
| 5,121,315 | 6/1992 | Moriya | 363/98 |
| 5,209,075 | 5/1993 | Kim | 62/126 |
| 5,280,228 | 1/1994 | Kanouda et al. | 363/98 |

FOREIGN PATENT DOCUMENTS 0133723 11/1978 Japan ................................ 363/98

Primary Examiner—Timothy S. Thorpe
Assistant Examiner—Xuan M. Thai
Attorney, Agent, or Firm—McGlew and Tuttle, P.C.

[57] ABSTRACT

A power supply for vibrating compressors having an inverter for converting direct current (d-c) into alternating current (a-c). The power supply includes a d-c power source section for applying d-c voltage to the inverter, a current detecting apparatures for detecting a current flowing in the vibrating compressor, a control section having a frequency following circuit for generating a frequency following the resonance frequency of the vibrating compressor on the basis of a current detected by the current detecting apparatures, and an inverter control circuit for controlling the inverter with the frequency generated by the frequency following circuit. The vibrating compressor is driven by an a-c voltage of the frequency agreeing with the resonance frequency of the vibrating compressor.

27 Claims, 22 Drawing Sheets

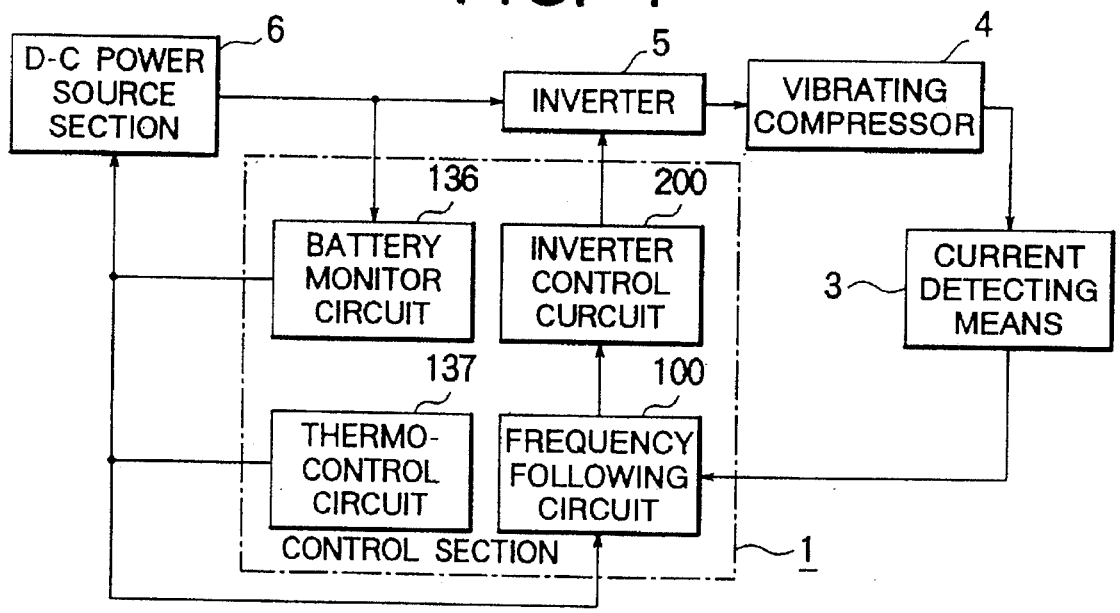
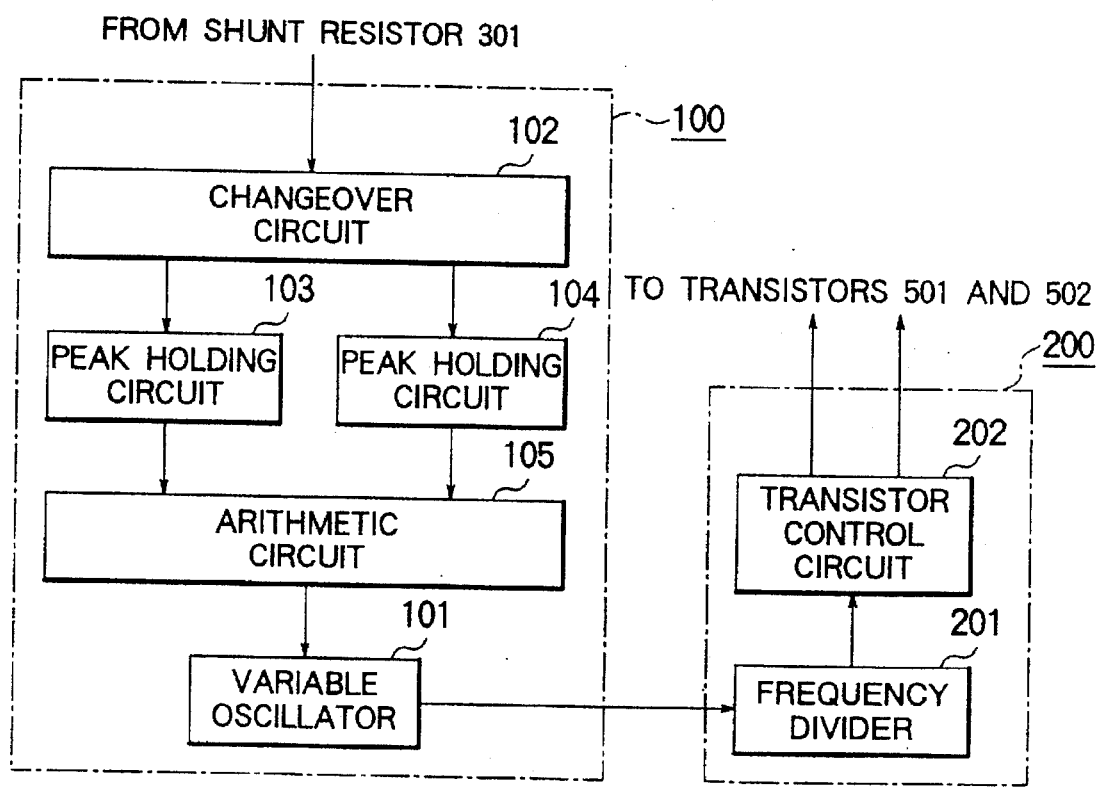

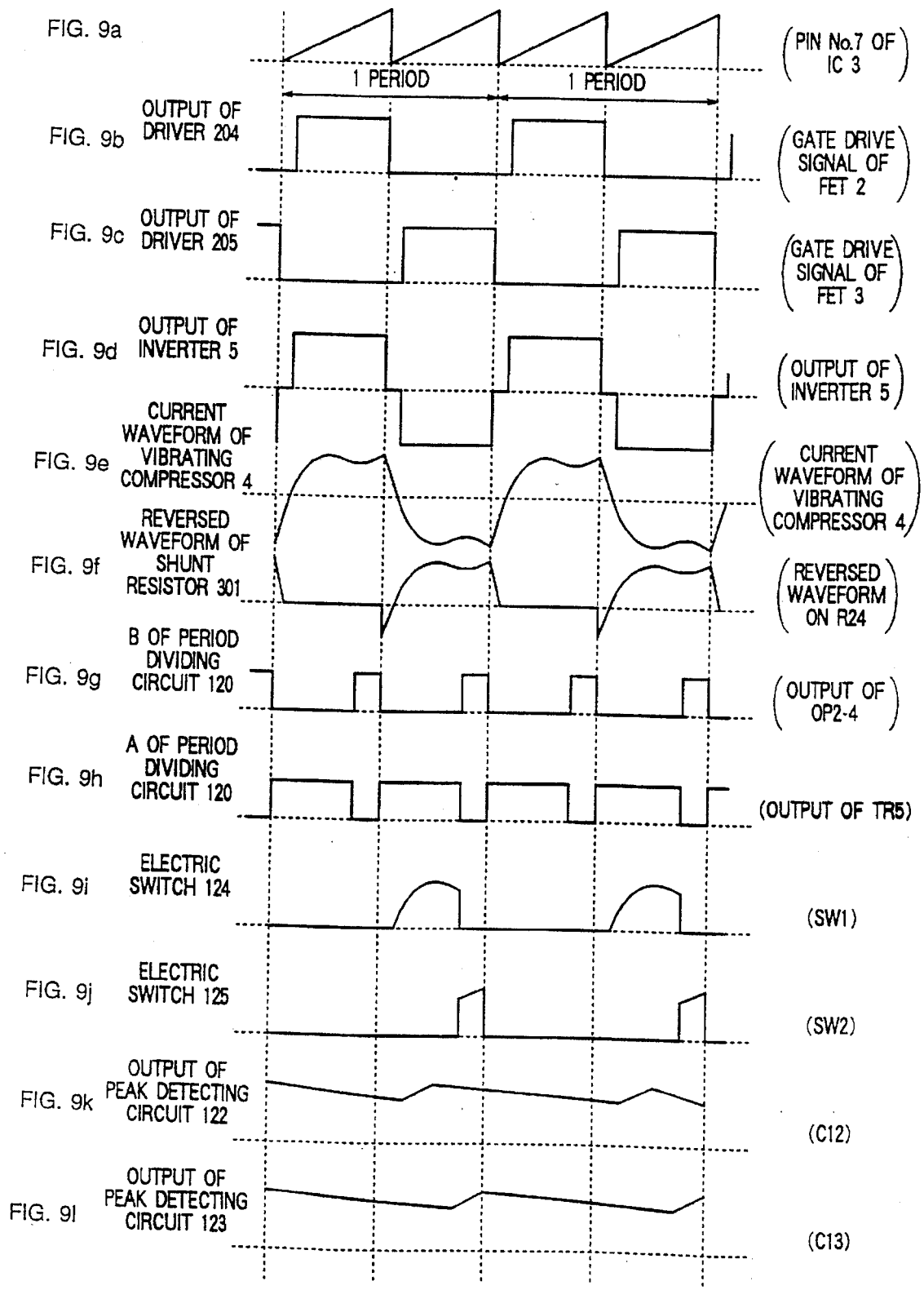

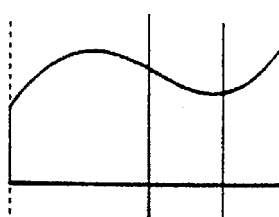
FIG. 10a
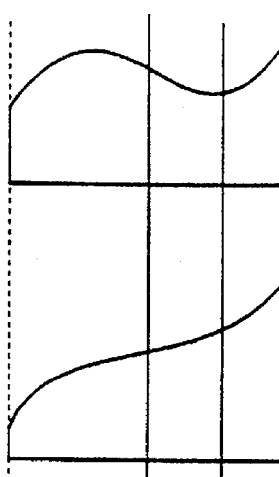
FIG. 10b
FIG. 10c
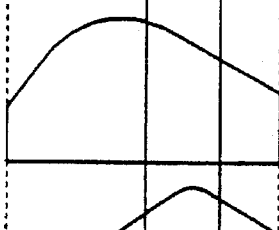
FIG. 10d
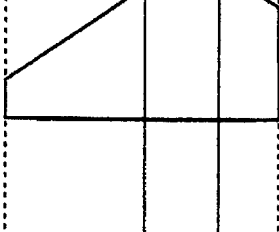
  L
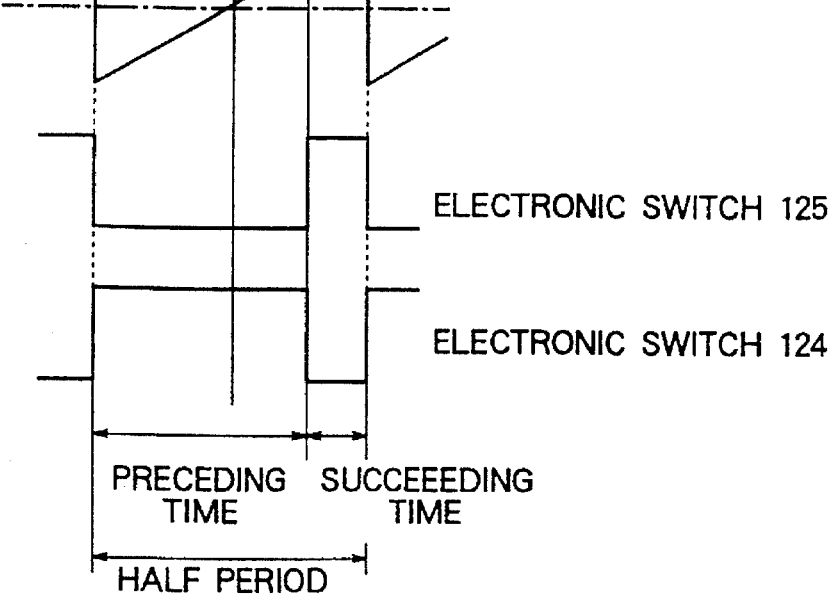
FIG. 10f — ELECTRONIC SWITCH 125
FIG. 10g — ELECTRONIC SWITCH 124
PRECEDING TIME | SUCCEEEDING TIME
HALF PERIOD

FIG. 13
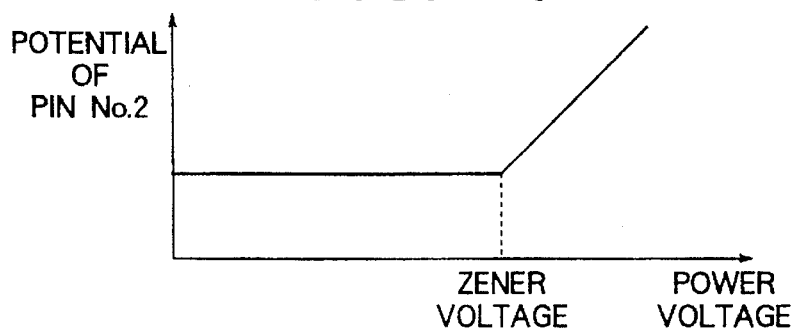
FIG. 14A
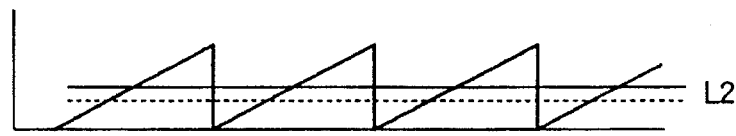
FIG. 14B  PIN No.12
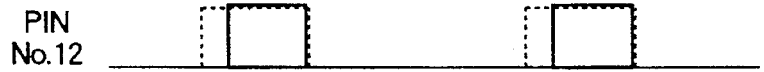
FIG. 14C  PIN No.13
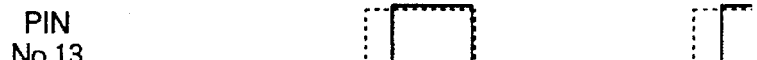
FIG. 15
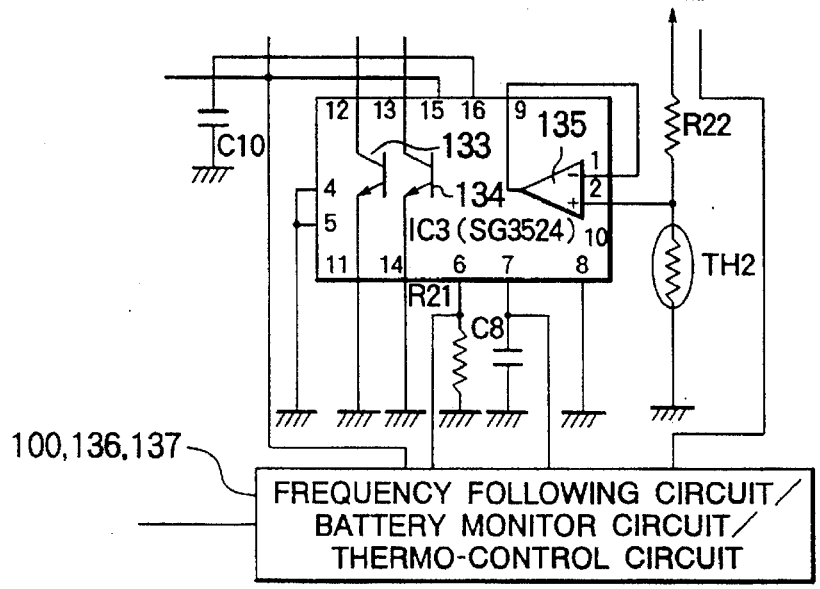

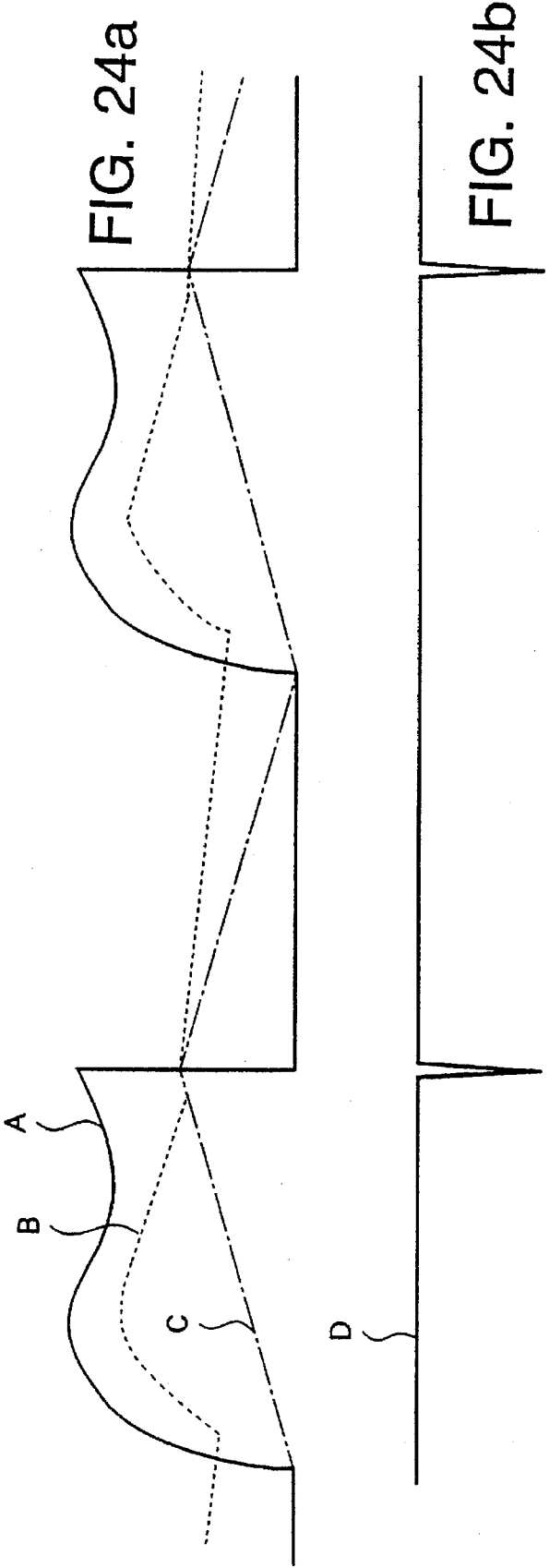

PIN No. 3 OF
TIMER IC 160

FET 503

FET 504

SHUNT
RESISTER 301

OP AMPLIFIER 174

PEEK HOLDING
CIRCUIT 172

INTERGRATION
CIRCUIT 173

PULSE FORCED
REVERSING
CIRCUIT 172

PIN Nos. 5 AND 6
OF TIMER IC 160

POWER SUPPLY FOR VIBRATING COMPRESSORS

BACKGROUND OF THE INVENTION

1. Field of the Invention

This invention relates generally to a power supply for vibrating compressors, and more particularly to a power supply for vibrating compressors adapted to generate an a-c voltage of a frequency following the resonance frequency (natural frequency) of the vibrating compressor, which tends to fluctuate in accordance with the service environment such as load and ambient temperatures.

2. Description of the Prior Art

An increasing number of cooling units using vibrating compressors have been installed on automobiles. In the cooling unit, the d-c power of an automobile, that is, a car battery, is used as the drive source of the vibrating compressor. The vibrating compressor has such a construction that a drive coil caused to vibrate in a magnetic field by an alternating current fed from the outside drives the piston.

In a conventional type of power supply for vibrating compressors using a car battery, for example, as the drive source, where the mechanical resonance frequency of a vibrating compressor is predetermined by its construction, an a-c voltage of a fixed frequency is generated on the basis of the battery voltage end fed to the vibrating compressor.

Since the resonance frequency of the vibrating compressor, however, varies with changes in load, or the service environment, the conventional construction where the power frequency to be fed to the vibrating compressor is kept constant tends to result in poor efficiency.

A control method with good efficiency is desired particularly for applications where a battery is used as the drive source.

The present applicant filed a patent application (Japanese Published Unexamined Patent Application No. Sho-61 (1986)-173676) where the vibrating compressor is driven by always keeping it under the optimum condition by causing the vibrating period of the electrical vibrating system in the vibrating compressor to agree with the natural vibrating period of the mechanical vibrating system.

It was experimentally revealed that efficient driving is realized when the difference in first and second peaks of the input current waveform is a certain value.

SUMMARY OF THE INVENTION

It is an object of this invention to provide a power supply for vibrating compressors for generating an a-c voltage of a frequency following changes in the resonance frequency of the vibrating compressor.

It is another object of this invention to provide a polarity reversing circuit suitable for applying positive and negative powers to the inverter.

It is a further object of this invention to provide an a-c/d-c automatic converter unit.

It is still a further object of this invention to provide a power supply for vibrating compressors designed to protect the battery and save power.

It is still a further object of this invention to provide a frequency following circuit for generating a frequency following the resonance frequency of the vibrating compressor.

The power supply for vibrating compressors in a disclosed embodiment is a power supply for vibrating compressors having an inverter for converting direct current into a-c comprising a d-c power source section for applying d-c voltage to the inverter, current detecting means for detecting a current flowing in the vibrating compressor, and a control section having a frequency following circuit for generating a frequency following the resonance frequency of the vibrating compressor on the basis of a current detected by the current detecting means, and an inverter control circuit for controlling the inverter with the frequency generated by the frequency following circuit, so that the vibrating compressor is driven by an a-c voltage of the frequency agreeing with the resonance frequency of the vibrating compressor.

BRIEF DESCRIPTION OF THE DRAWING

FIG. 1 is a diagram illustrating the basic construction of this invention.

FIG. 3 shows the construction of an embodiment of the control section.

FIG. 9a is a diagram illustrating an operating wave form.
FIG. 9b is a diagram illustrating an operating wave form.
FIG. 9c is a diagram illustrating an operating wave form.
FIG. 9d is a diagram illustrating an operating wave form.
FIG. 9e is a diagram illustrating an operating wave form.
FIG. 9f is a diagram illustrating an operating wave form.
FIG. 9g is a diagram illustrating an operating wave form.
FIG. 9h is a diagram illustrating an operating wave form.
FIG. 9i is a diagram illustrating an operating wave form.
FIG. 9j is a diagram illustrating an operating wave form.
FIG. 9k is a diagram illustrating an operating wave form.
FIG. 9l is a diagram illustrating an operating wave form.

FIG. 10a is a diagram explaining the detection of a maximum peak in a waveform.
FIG. 10b is a diagram explaining the detection of a maximum peak in a wave form.
FIG. 10c is a diagram explaining the detection of a maximum peak in a wave form.
FIG. 10d is a diagram explaining the detection of a maximum peak in a wave form.
FIG. 10f is a diagram explaining the detection of a maximum peak in a wave form.

3

FIG. 10g is a diagram explaining the detection of a maximum peak in a wave form.

Figure 8:
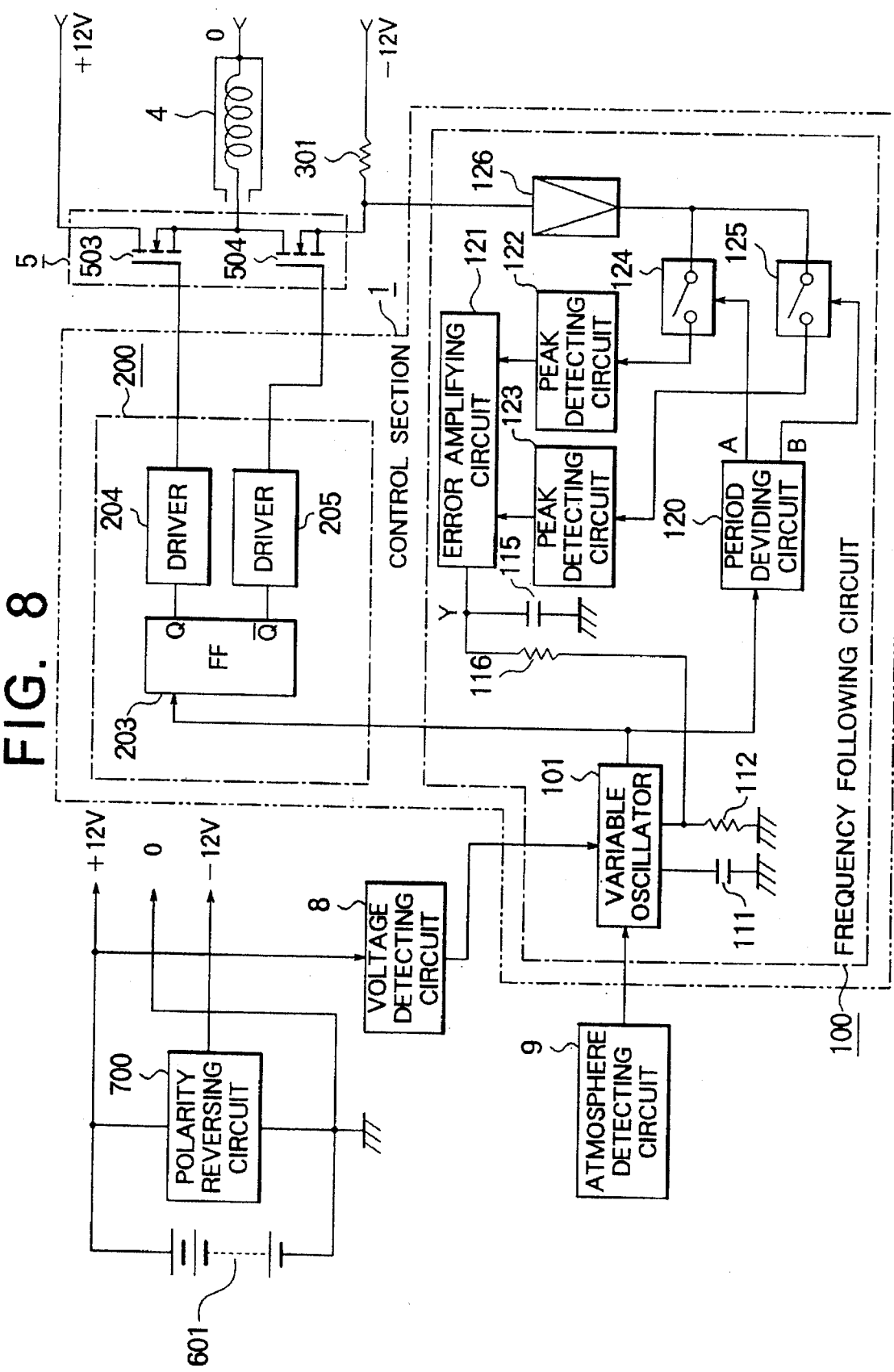
FIG. 8 shows the construction of another embodiment of this invention.
Figure 11:
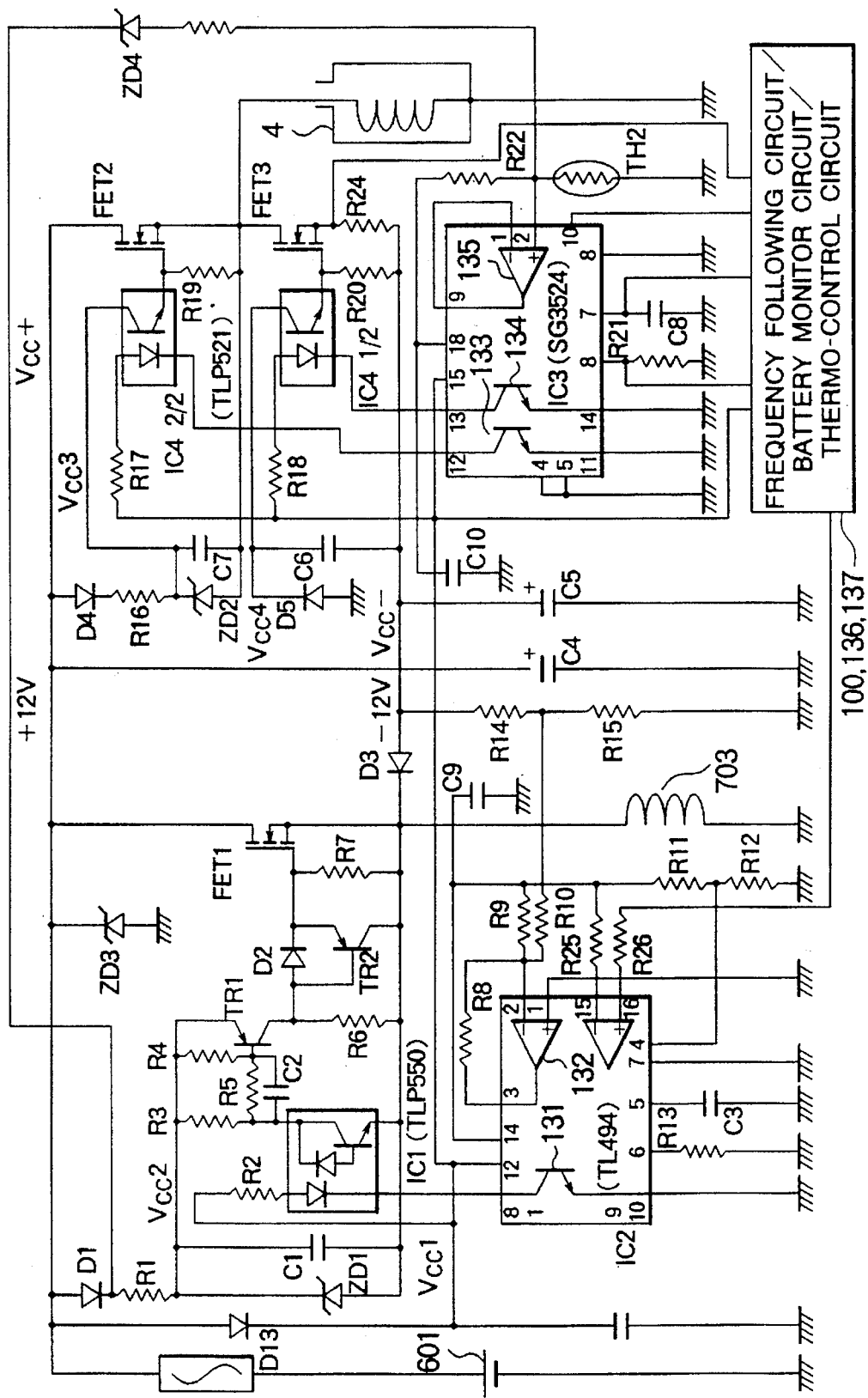

FIG. 11 is a circuit diagram of another specific embodiment of FIG. 8.

Figure 12:
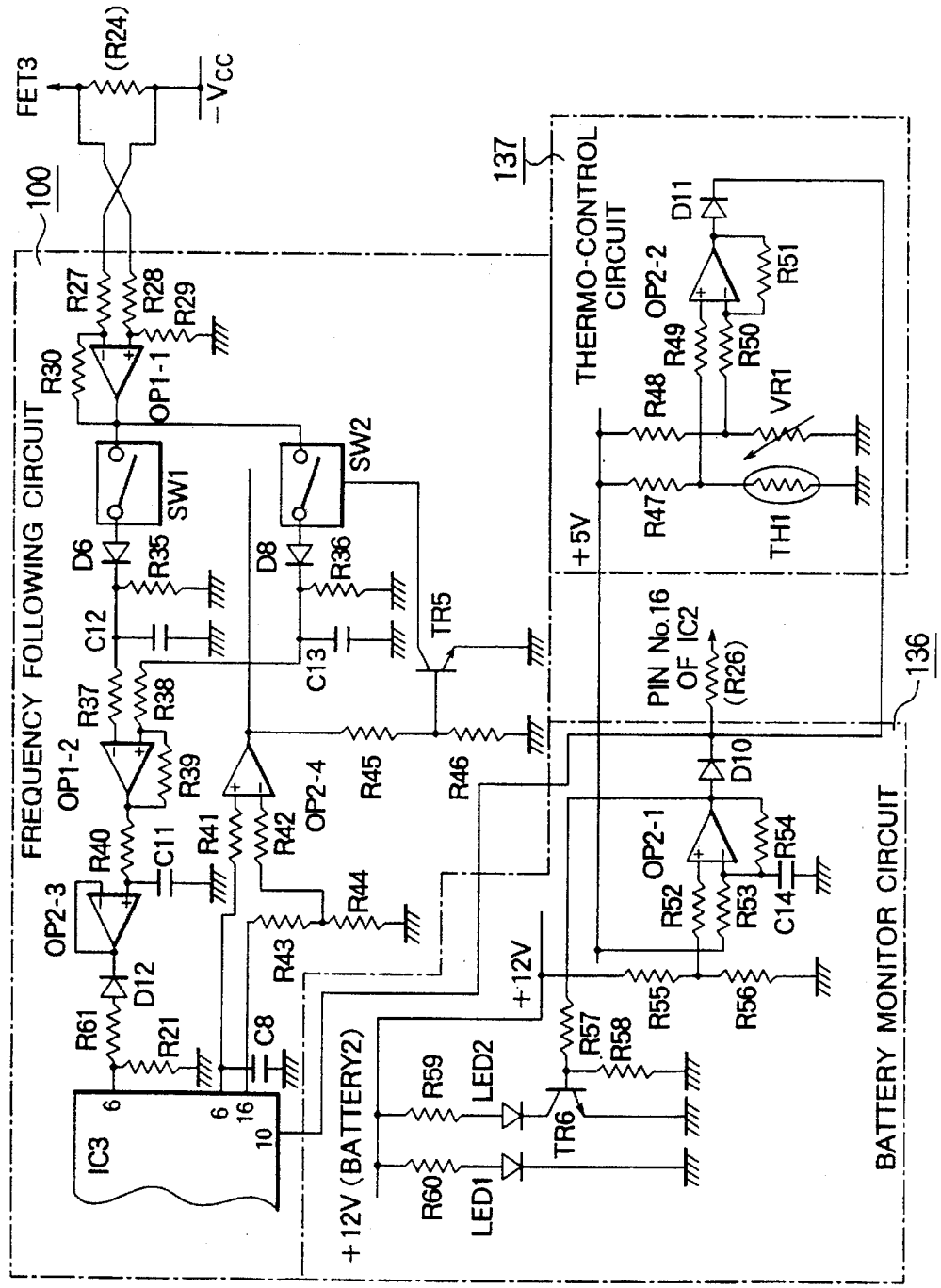

FIG. 12 is a circuit diagram of a specific embodiment of the frequency following circuit, the battery monitor circuit and the thermo-control circuit used in FIG. 11.

FIG. 13 is a diagram of assistance in explaining changes in potential on Pin No. 2 of an IC 3 with respect to increases in d-c voltage.

FIG. 14a is a diagram of assistance in explaining changes in the potential of output pulse width.

FIG. 14b is a diagram of assistance in explaining changes in the potential of output pulse width.

FIG. 14c is a diagram of assistance in explaining changes in the potential of output pulse width.

FIG. 15 is a diagram of assistance in explaining part of the construction of another example of means for preventing the valve hitting phenomenon, caused by an excessively extended piston stroke.

Figure 16:
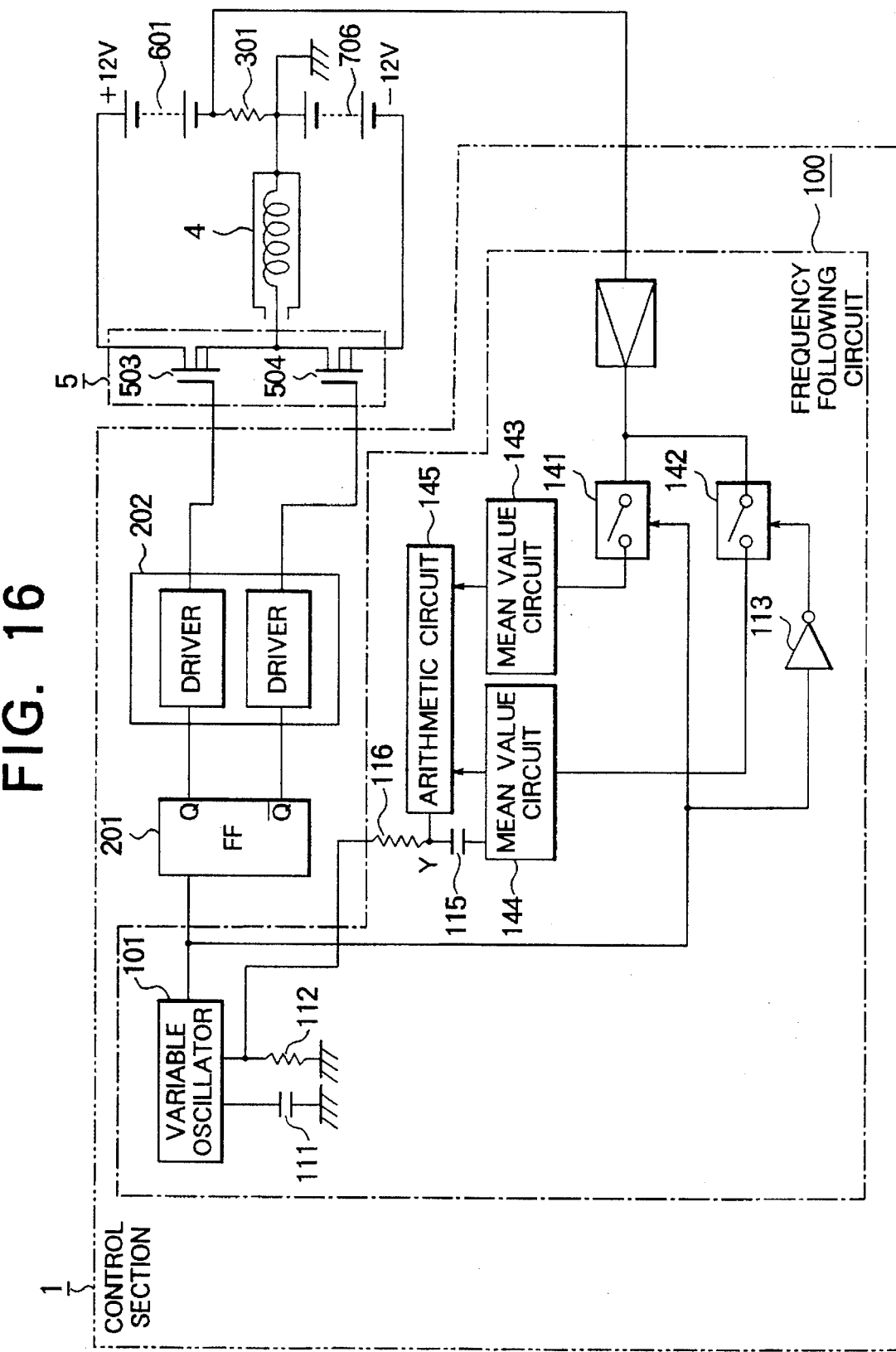

FIG. 16 shows the construction of another embodiment of this invention.

Figure 17A:
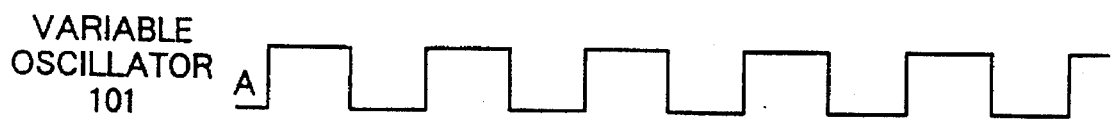

FIG. 17a is a diagram of assistance in explaining an operating wave form.

Figure 17B:

FIG. 17b is a diagram of assistance in explaining an operating wave form.

Figure 17C:
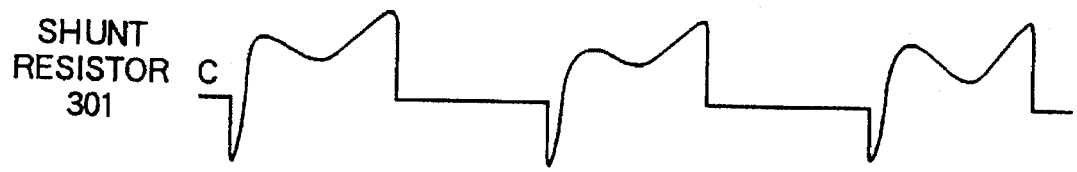

FIG. 17c is a diagram of assistance in explaining an operating wave form.

Figure 17D:
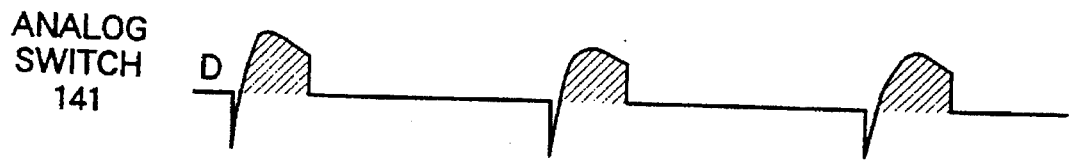

FIG. 17d is a diagram of assistance in explaining an operating wave form.

Figure 17E:

FIG. 17e is a diagram of assistance in explaining an operating wave form.

Figure 18:
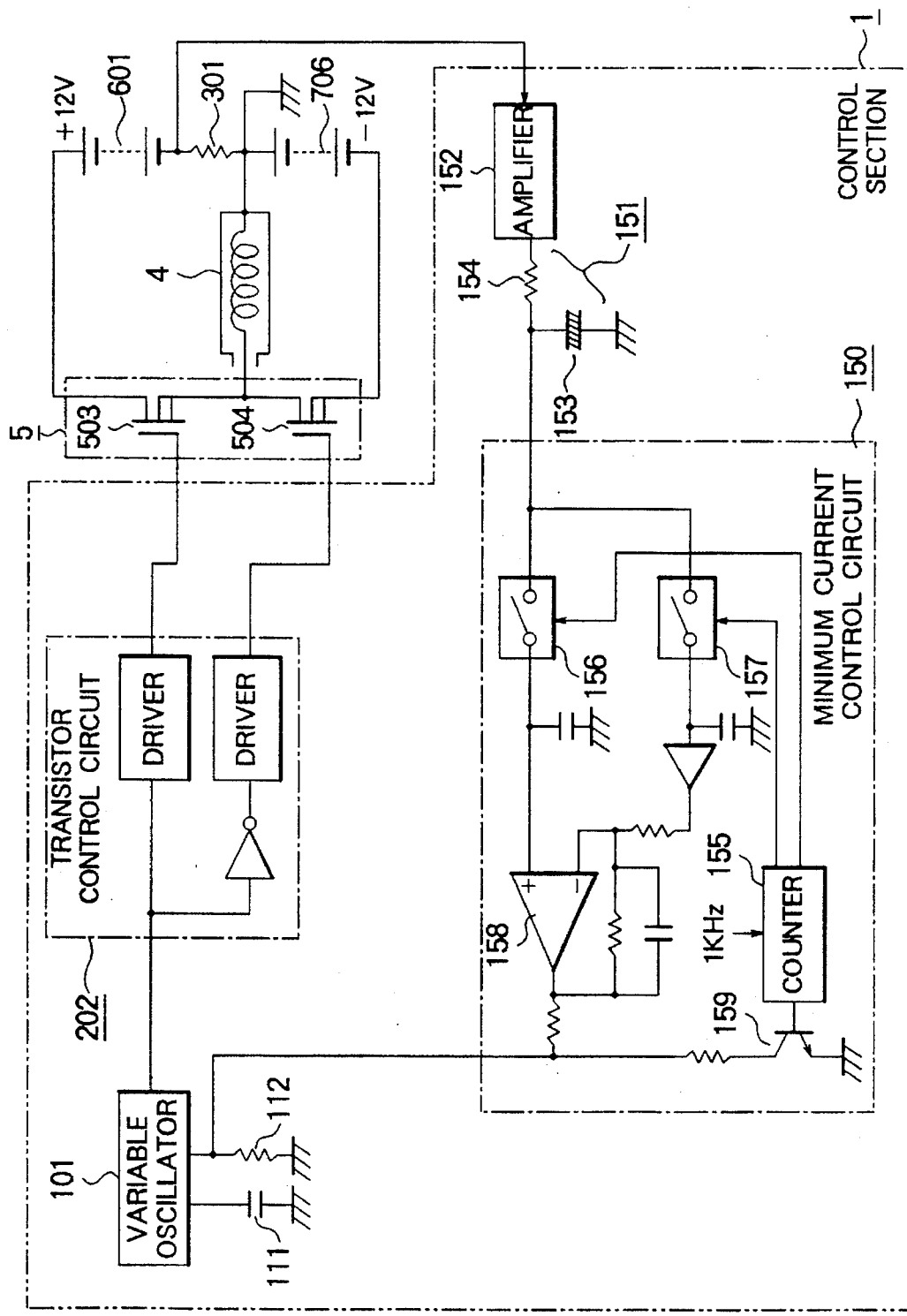

FIG. 18 shows the construction of still another embodiment of this invention.

Figure 19:
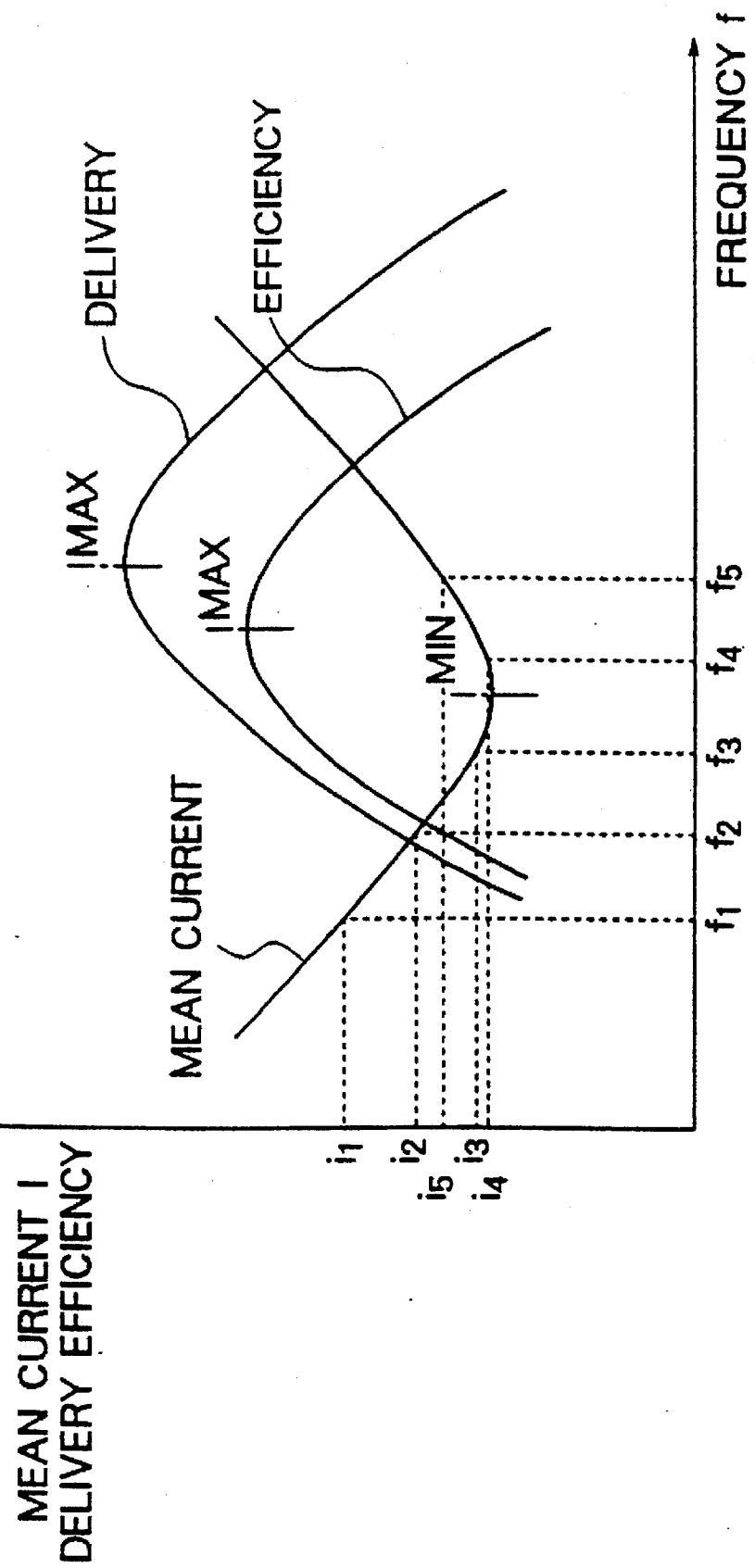

FIG. 19 is a characteristic diagram of an embodiment of a vibrating motor.

Figure 20:
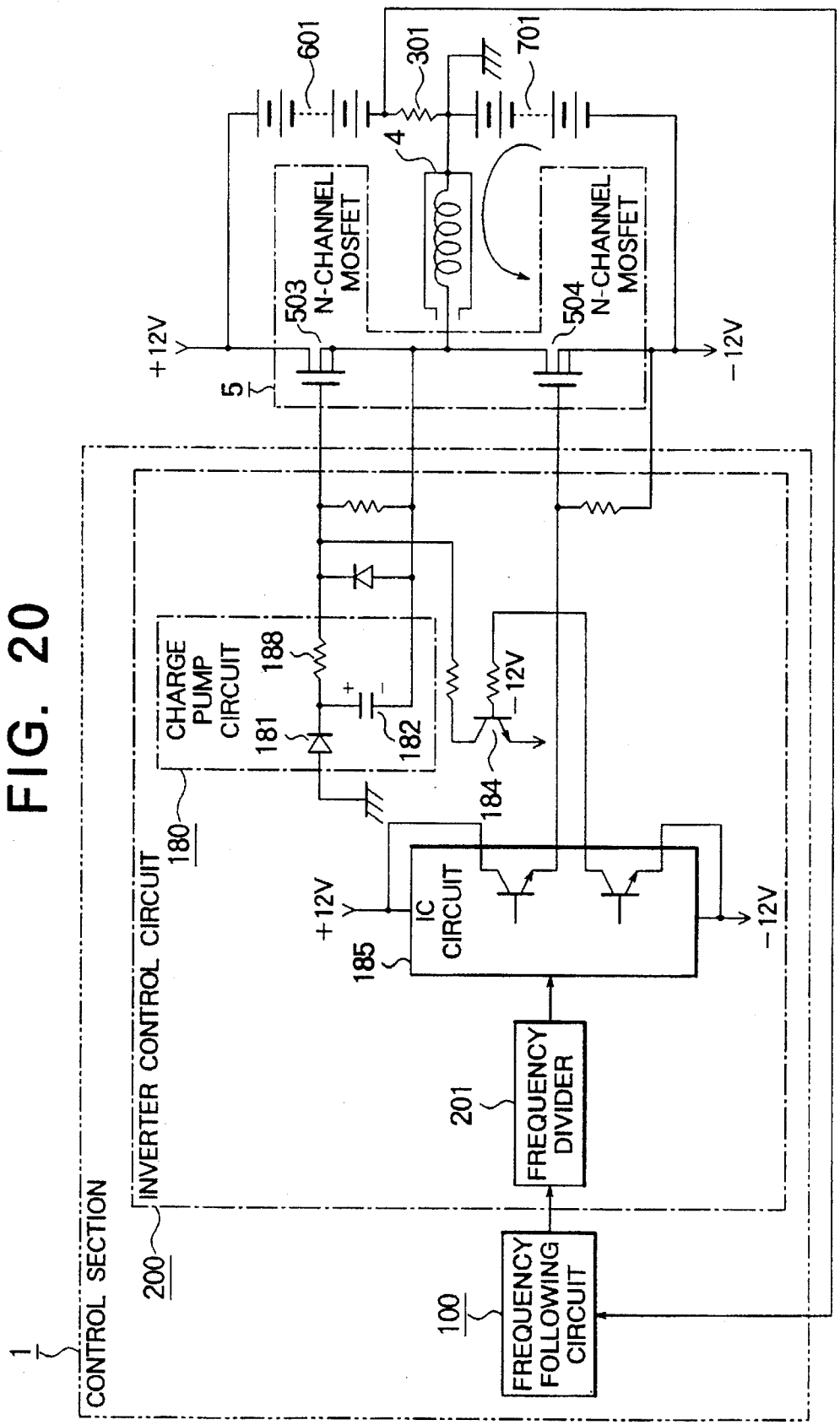

FIG. 20 shows the construction of still another embodiment of this invention.

Figure 21:
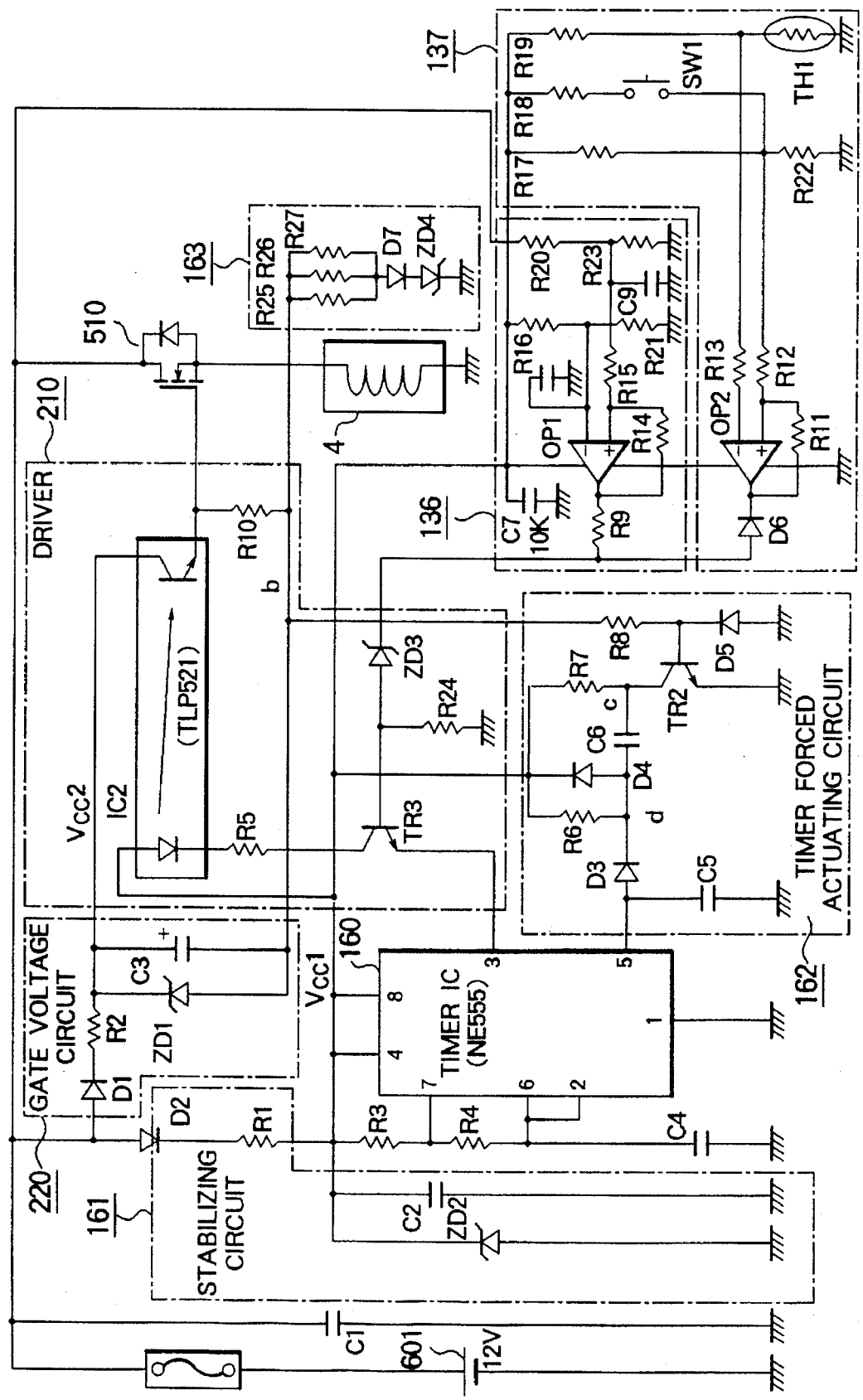

FIG. 21 shows the construction of still another embodiment of this invention.

FIG. 22a is a time chart of assistance in explaining the operation of this invention.

FIG. 22b is a time chart of assistance in explaining the operation of this invention.

FIG. 22c is a time chart of assistance in explaining the operation of this invention.

FIG. 22d is a time chart of assistance in explaining the operation of this invention.

FIG. 22e is a time chart of assistance in explaining the operation of this invention.

FIG. 22f is a time chart of assistance in explaining the operation of this invention.

FIG. 22g is a time chart of assistance in explaining the operation of this invention.

Figure 23:
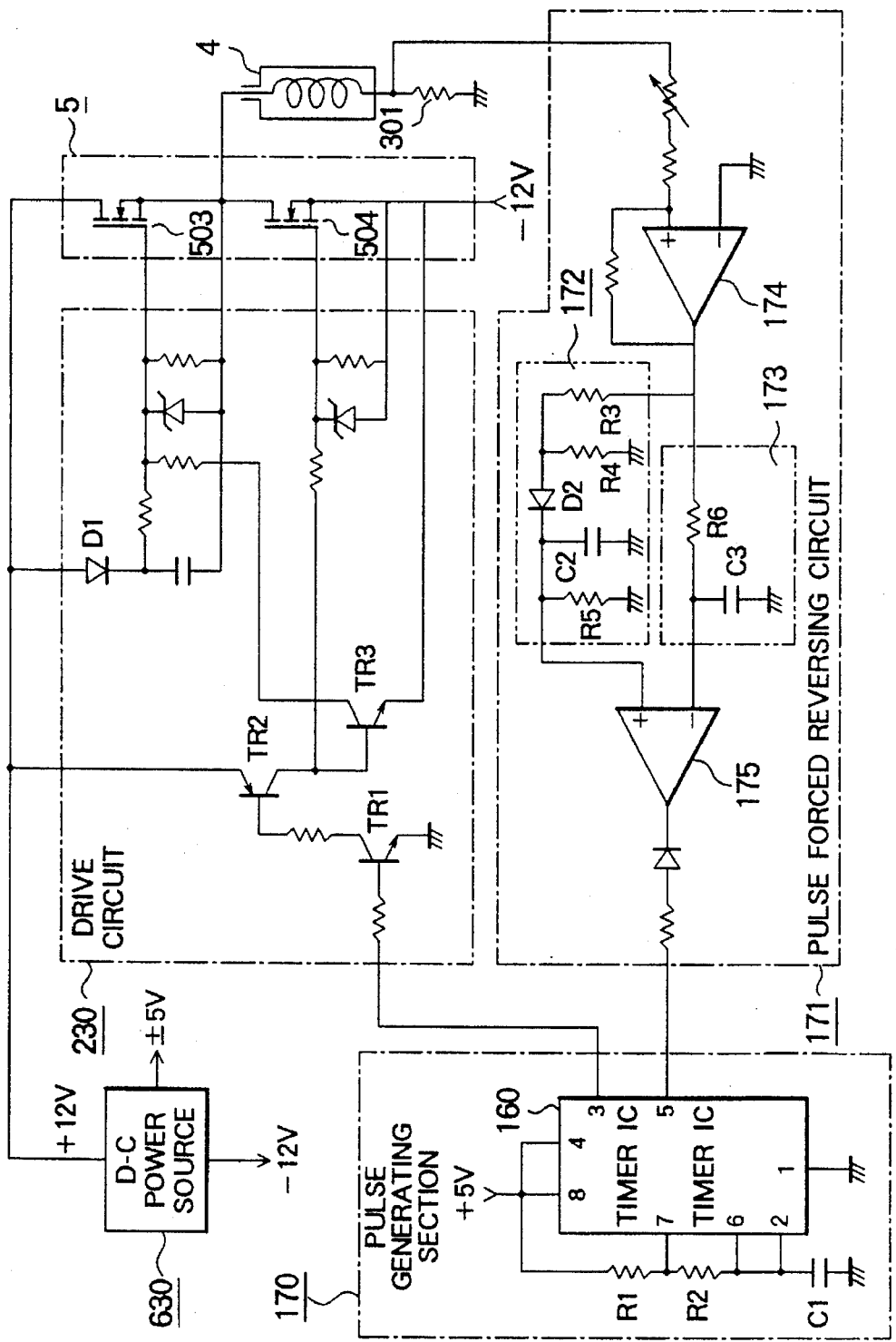

FIG. 23 shows the construction of still another embodiment of this invention.

FIG. 24a is a diagram of assistance in explaining the timing waveforms for generating a trigger signal for forcibly reversing pulses.

FIG. 24b is a diagram of assistance in explaining a timing of a pulse waveform.

FIG. 25 is a time chart of assistance in explaining the operation of this invention.

4

Figure 25A:
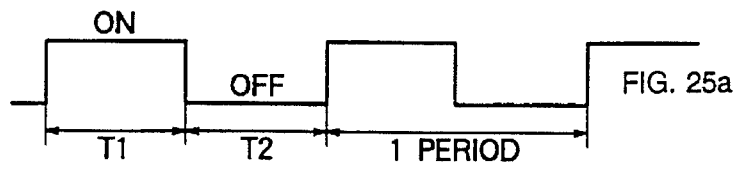
Figure 25B:

FIG. 25b is a time chart of assistance in explaining the operation of this invention.

Figure 25C:

FIG. 25c is a time chart of assistance in explaining the operation of this invention.

Figure 25D:
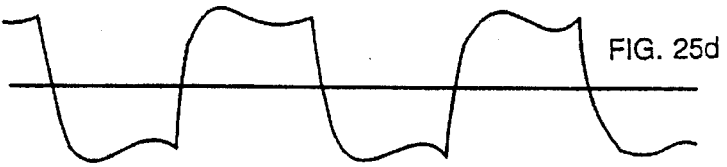

FIG. 25d is a time chart of assistance in explaining the operation of this invention.

Figure 25E:

FIG. 25e is a time chart of assistance in explaining the operation of this invention.

Figure 25F:

FIG. 25f is a time chart of assistance in explaining the operation of this invention.

Figure 25G:

FIG. 25g is a time chart of assistance in explaining the operation of this invention.

Figure 25H:

FIG. 25h is a time chart of assistance in explaining the operation of this invention.

Figure 25I:
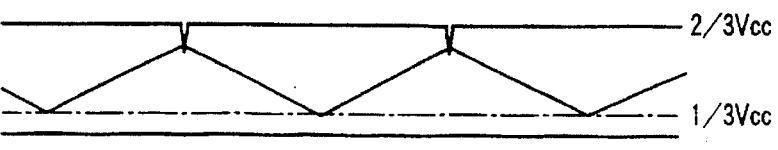

FIG. 25i is a time chart of assistance in explaining the operation of this invention.

DETAILED DESCRIPTION OF PREFERRED EMBODIMENTS

FIG. 1 is a diagram illustrating the basic construction of this invention.

In FIG. 1, reference numeral 1 refers to a control section; 3 to current detecting means; 4 to a vibrating compressor; 5 to an inverter; 6 to a d-c power source section; 100 to a frequency following circuit; 200 to an inverter control circuit; 136 to a battery monitor circuit; and 137 to a thermo-control circuit, respectively.

The voltage of the d-c power source section 6 as the drive unit of the vibrating compressor 4 is applied to the inverter 5. The inverter 5 converts d-c voltage into a-c voltage, which in turn is fed to the vibrating compressor 4. The current detecting means 3 detects a current flowing in the vibrating compressor 4, and the control section 1 generates a control signal agreeing with the natural frequency, that is, the resonance frequency of the vibrating compressor 4, based on the current flowing in the vibrating compressor 4, to perform the switching control of the inverter 5. As a result, the frequency of the a-c voltage fed from the inverter 5 to the vibrating compressor 4 is controlled so as to maintain the frequency agreeing with the resonance frequency even if the resonance frequency of the vibrating compressor 4 changes, depending on the load or service environment of the vibrating compressor.

The battery monitor circuit 136 monitors a voltage drop in the d-c power source section 6; it stops the power supply therefrom when the voltage of the d-c power source section 6, a battery, for example, falls below a predetermined level, and the thermo-control circuit 137 stops the power supply from the battery when the temperature in the refrigerator falls below a predetermined level to protect the battery and save power.

Figure 2:
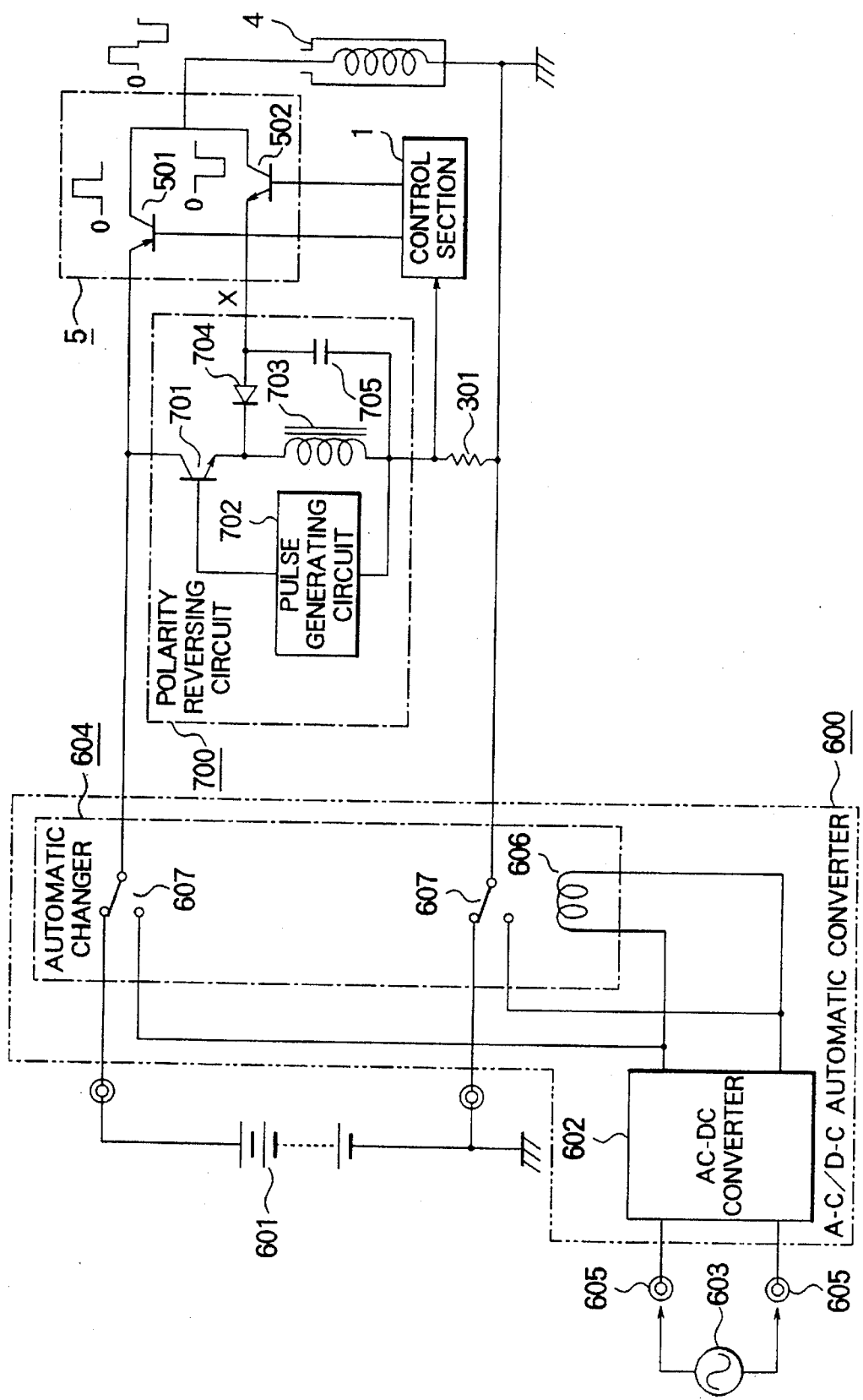
FIG. 2 shows the construction of an embodiment of this invention.

FIG. 2 shows the construction of an embodiment of this invention.

FIG. 2 shows the power supply of an a-c/d-c vibrating compressor. The vibrating compressor 4 is a compressor for refrigerators operating from a power of low a-c voltage, or of 12 V or 24 V, for example, as mentioned above.

A battery 601 is a d-c power source of 12 V or 24 V, installed on an automobile, serving as a power source for the vibrating compressor 4.

A polarity reversing circuit 700 is a circuit for reversing the polarity of the voltage of the battery 601, comprising a transistor 701, a pulse generating circuit 702, a choke coil 703, a diode 704 and a capacitor 705.

The pulse generating circuit 702 using an astable multivibrator circuit, etc., for example, turns on and off the transistor 701, and the transistor 701 generates pulses. Since these pulses are applied to the choke coil 703, electromagnetic energy is accumulated in the choke coil 703. When the transistor 701 is turned off, the current flowing in the choke coil 703 cannot change abruptly, and keeps flowing. The electromagnetic energy accumulated in the choke coil 703 charges the capacitor 705 in a circuit consisting of the capacitor 705 and the diode 704, making the diode 704 side of the capacitor 705 negative. In other words, a d-c voltage having an opposite polarity to the voltage of the battery 601 is generated on the output end X of the polarity reversing circuit 700.

An inverter 5 has transistors 501 and 502, which alternately turn on to generate a-c voltage that is fed to the vibrating compressor 4.

The control section 1 is a circuit for outputting a control signal to cause the transistors 501 and 502 to be turned on alternately, as mentioned earlier. The control section 1 performs such a control as to change the frequency applied to the vibrating compressor 4 by substantially changing the a-c voltage to be outputted from the inverter 5 by changing the duty ratio of each output waveform of the transistors 501 and 502 as a result of PWM control, for example.

An a-c/d-c automatic converter 600 is used for supplying the d-c voltage of the battery 601, or a commercial a-c power 603. The a-c/d-c automatic converter 600 is designed so that when the commercial a-c power 603 is connected to it, the d-c voltage on the side of the commercial a-c power 603 is fed to the vibrating compressor 4 in preference to the battery 601.

An a-c/d-c converter 602 is used to drive the vibrating compressor 4 from the commercial a-c power 603. In doing so, it converts the a-c voltage of the commercial a-c power 603 into a d-c voltage of the same potential as that of the d-c voltage of the battery 601.

An automatic changer 604 is used, when the commercial a-c power 603 is connected to a terminal 605, to connect the d-c power on the side of the a-c/d-c converter 602 in preference to the battery 601.

A shunt resistor 301 is used to detect a current flowing in the vibrating compressor 4. In FIG. 2, it detects a current flowing in the vibrating compressor 4, when driven by the negative d-c voltage that is polarity-reversed by the polarity reversing circuit 700.

As shown in FIG. 3, the control section 1 has the frequency following circuit 100 and the inverter control circuit 200; the frequency following circuit 100 having a variable oscillator 101, a changeover circuit 102, peak holding circuits 103 and 104, and an arithmetic circuit 105; and the inverter control circuit 200 having a frequency divider 201 and a transistor control circuit 202.

The variable oscillator 101 is an oscillating frequency-variable pulse generator.

The changeover circuit 102 is a circuit for changing over the current flowing in the shunt resistor 301 based on the oscillation frequency of the variable oscillator 101 at the intervals of the half-period of one period of the oscillating frequency.

The peak holding circuits 103 and 104 are circuits for detecting and holding the peak value of the current flowing in the shunt resistor 301 during the changeover period of the changeover circuit 102.

The arithmetic circuit 105 compares the peak values held by the two peak holding circuits 103 and 104 to control the oscillating frequency of the variable oscillator 101 so that the difference is kept at a predetermined value.

The frequency divider 201 is a circuit for halving the frequency of pulses generated by the variable oscillator 101.

The transistor control circuit 202 is a driver for controlling to alternately turn on the transistors 501 and 502 based on the pulses of the frequency divided in the frequency divider 201.

In the following, description will be made on the assumption that a power supply for vibrating compressors having the aforementioned construction drives a refrigerator installed on automobiles, etc., or a refrigerator car whose container itself serves as a refrigerator.

During the transportation of the refrigerator, a d-c voltage of the battery 601 installed on an automobile, etc. is applied to the vibrating compressor 4 via the automatic changer 604. That is, when the d-c voltage, 12 V, for example, of the battery 601 is inputted to the polarity reversing circuit 700 via the automatic changer 604, −12 V is generated on the output terminal X of the polarity reversing circuit 700, as described above. As the transistors 501 and 502 in the inverter 5 are alternately turned on by a control signal inputted from the control section 1, a voltage of a half-period changing from zero potentials to 12 V and zero potentials generated based on the operation of transistor 501 is applied to the vibrating compressor 4, then a voltage of a half-period changing from zero potentials to −12 V and zero potentials generated based on the operation of the transistor 502 is applied. This means that an a-c voltage of one period having positive and negative polarities centering around zero potentials is applied.

In other words, a so-called single-end push-pull (SEPP) circuit with the vibrating compressor 4 as the load, is composed of the transistors 501 and 502, and the control section 1, and an a-c voltage having positive and negative polarities centering around zero potentials is applied to the vibrating compressor 4. Consequently, one of the input terminals of the vibrating compressor 4 can be connected to the ground, or a grounding wire can be connected to the case of the vibrating compressor 4, as shown in FIG. 2. Thus, the construction of the vibrating compressor 4 can be simplified.

In the control section 1, the changeover circuit 102 changes over the current flowing in the shunt resistor 301 based on the oscillation frequency of the variable oscillator 101 at the intervals of the half-period of one period of the oscillation frequency. The peak value of the current flowing in the shunt resistor 301 is detected and held by the peak holding circuits 103 and 104 during the changing period of the changeover circuit 102. The arithmetic circuit 105 compares both peak values held by the two peak holding circuits 103 and 104, and outputs a control signal for changing the oscillation frequency of the variable oscillator 101 so that the difference is kept at a predetermined value.

Thus, the vibrating compressor 4 can be driven at an excellent efficiency since an a-c voltage of a frequency following changes in the resonance frequency in accordance with changes in load or changes in ambient temperature in the vibrating compressor 4 can be generated because the variable oscillator 101 generates pulses of a frequency corresponding to the control signal.

When the automobile arrives at the destination, and the commercial a-c power 603 is connected to the terminal 605, 12 V of the same potential as that of the d-c voltage of the battery 601 is outputted from the a-c/d-c converter 602. The 12-V d-c voltage from the a-c/d-c converter 602 energizes a relay coil 606, causing the relay contact 607 thereof to change over to the side of the a-c/d-c converter 602. When driving the vibrating compressor 4 from the commercial a-c power 603, an a-c voltage having positive and negative polarities centering around zero potentials is applied to the vibrating compressor 4 by performing exactly the same operation as in driving the vibrating compressor 4 from the battery 601, as described above.

Figure 4:
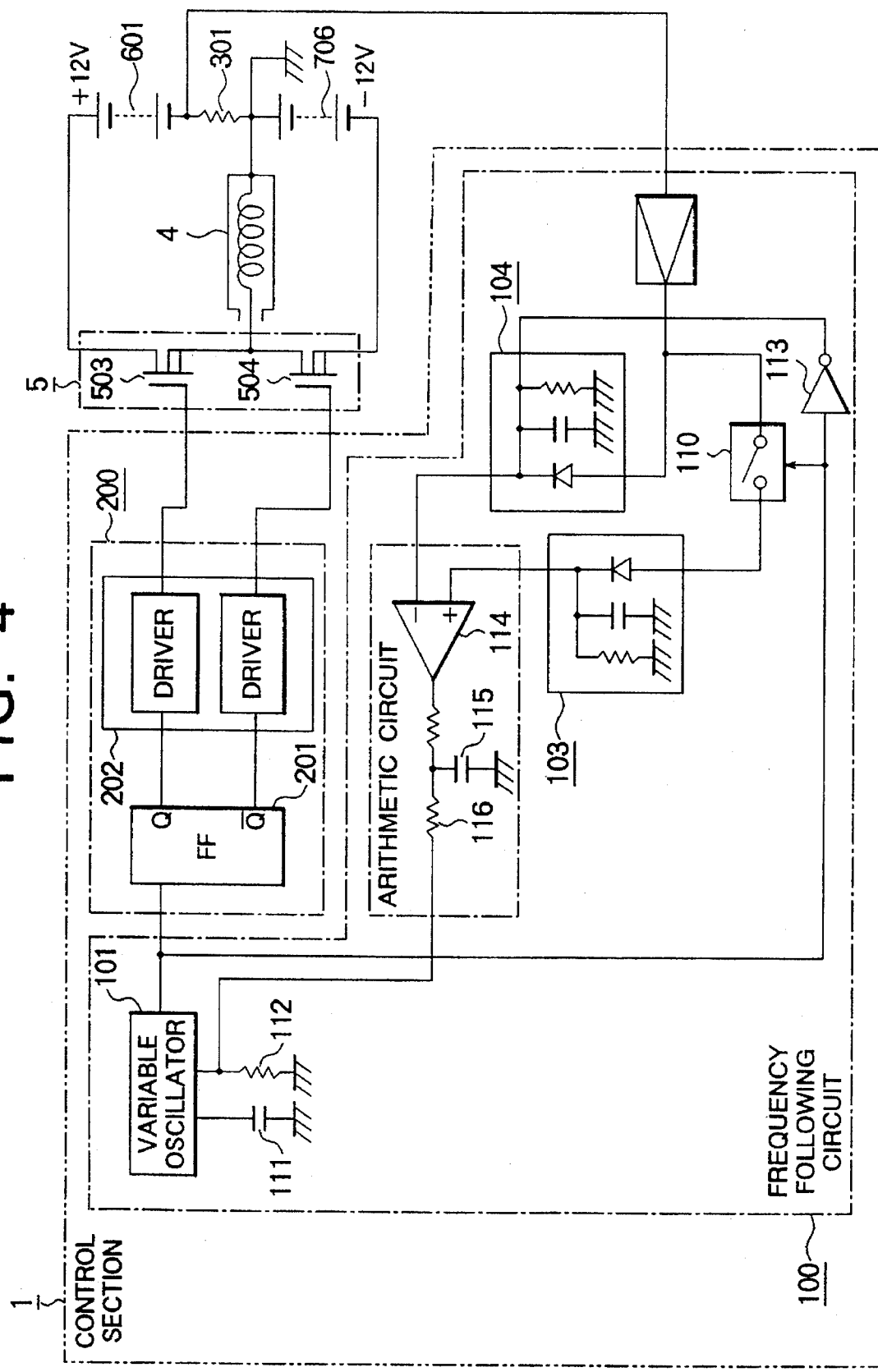
FIG. 4 shows the construction of an embodiment of the specific circuits of the power supply for vibrating compressors according to this invention.

FIG. 4 shows the construction of an embodiment of a specific circuit of the power supply for vibrating compressors according to this invention.

In FIG. 4, the shunt resistor 301 is adapted to detected a current flowing in the vibrating compressor 4 when the 12-V d-c voltage of the battery 601 is applied to the vibrating compressor 4. A d-c power 706 corresponds to the polarity reversing circuit 700 shown in FIG. 2, while an analog switch 110 corresponds to the changeover circuit 102 shown in FIG. 3. MOS-FETs (hereinafter referred to as FETs) 503 and 504 are used as the transistors 501 and 502.

Operations with reference to FIG. 4 will be described in the following, referring to FIG. 5 which is an operating waveform diagram.

Figure 5A:
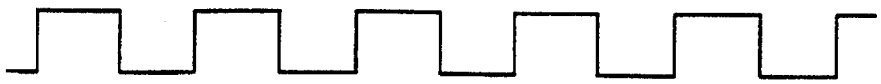
FIG. 5a is a diagram showing an operating wave form of the embodiment of FIG. 4.
Figure 5B:
FIG. 5b is a diagram showing an operating wave form of the embodiment of FIG. 4.

The variable oscillator 101 is designed so that when the design natural frequency, that is, the resonance frequency of the vibrating compressor 4 is 50 Hz, the variable oscillator 101 oscillates pulses of a frequency of 100 Hz, twice as high as the 50-Hz natural frequency (FIG. 5A).

As mentioned earlier, the variable oscillator 101 can change the 100-Hz oscillation frequency in such a manner that the 100-Hz oscillation frequency can be determined by a time constant CR of the capacitance C of a capacitor 111 and the resistance R of a resistor 112 (when viewed from the variable oscillator 101) connected to the variable oscillator 101.

The flip-flop circuit of the frequency divider 201 halves the 100-Hz oscillation frequency of the variable oscillator 101, and the outputs thereof Q and $\bar{Q}$ control in such a manner as to alternately turn on the FETs 503 and 504 in the inverter 5 via each driver of the transistor control circuit 202.

Figure 5C:
FIG. 5c is a diagram showing an operating wave form of the embodiment of FIG. 4.

Noting the FET 503, when the FET 503 is turned on (FIG. 5B), the current flowing in the vibrating compressor 4 is detected by the shunt resistor 301 (FIG. 5C).

The 100-Hz pulses (whose duty ratio is 50%) generated by the variable oscillator 101, on the other hand, turn on the analog switch 110, and at the same time turn off the peak holding circuit 104 via a reversing circuit 113 during the period when the 100-Hz pulses are at the H level. During the period when the 100-Hz pulses are at the L level, the 100-Hz pulses turn off the analog switch 110, and turn on the peak holding circuit 104 via the reversing circuit 113. That is, the waveform of the current flowing in the vibrating compressor 4 detected by the shunt resistor 301 is halved into portions corresponding to the preceding half-period and the succeeding half-period of one period of the pulses by the analog switch 110 and the reversing circuit 113.

Figure 5D:
FIG. 5d is a diagram showing an operating wave form of the embodiment of FIG. 4.
Figure 5E:
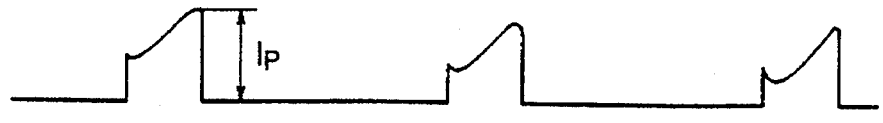
FIG. 5e is a diagram showing an operating wave form of the embodiment of FIG. 4.

Consequently, the current waveform shown in FIG. 5D is inputted into the peak holding circuit 103, while the current waveform shown in FIG. 5E is inputted into the peak holding circuit 104.

The peak holding circuits 103 and 104 detect the peaks of the current waveforms inputted, and hold those peak values.

A peak value $I_p$ inputted earlier from the peak holding circuit 103 is compared with a peak value $I_p$ inputted later from the peak holding circuit 104 in an operational amplifier 114 in the arithmetic circuit 105 by a timing signal from a timing circuit (not shown). The peak value inputted later from the peak holding circuit 104, for example, is compared in the arithmetic circuit 105 with the peak value inputted earlier from the peak holding circuit 103, and a control signal is outputted by the arithmetic circuit 105 so that the difference between the peak values inputted into the arithmetic circuit 105 is kept at a predetermined value, and thereby a capacitor 115 is charged.

If the charging amount of the capacitor 115 charged by the control signal from the arithmetic circuit 105 is low, and as a result the voltage at the point Y where the capacitor 115 and the resistor 116 are connected to each other becomes low, the aforementioned time constant CR changes. Thus, the oscillation frequency of the variable oscillator 101 become higher accordingly, and a control signal is outputted by the arithmetic circuit 105 so that the difference between both peak values inputted in the arithmetic circuit 105 is kept at a predetermined value, and thereby the feedback system is stabilized. In other words, the frequency of an a-c voltage driving the vibrating compressor 4 is caused to follow the resonance frequency of the vibrating compressor 4. If the voltage at the point Y becomes higher, on the contrary, the oscillation frequency generated by the variable oscillator 101 becomes lower and is controlled so as to agree with the resonance frequency of the vibrating compressor 4.

As described above, pulses of a frequency following the resonance frequency of the vibrating compressor 4 are generated by the variable oscillator 101 so that the FETs 503 and 504 in the inverter 5 are alternately turned on via each driver of the frequency divider 201 and the transistor control circuit 202 constituting the inverter control circuit 200. Thus, the vibrating compressor 4 can be driven at the maximum efficiency even when the resonance frequency of the vibrating frequency changes due to changes in the load of the vibrating compressor 4.

As current detecting means for detecting a current flowing in the vibrating compressor 4, a current transformer based on a Hall element, a drain-source resistance $V_{DS}$ of an FET, or a fuse can be used, other than the shunt resistor 301. The same holds true in embodiments shown in the following.

Figure 6:
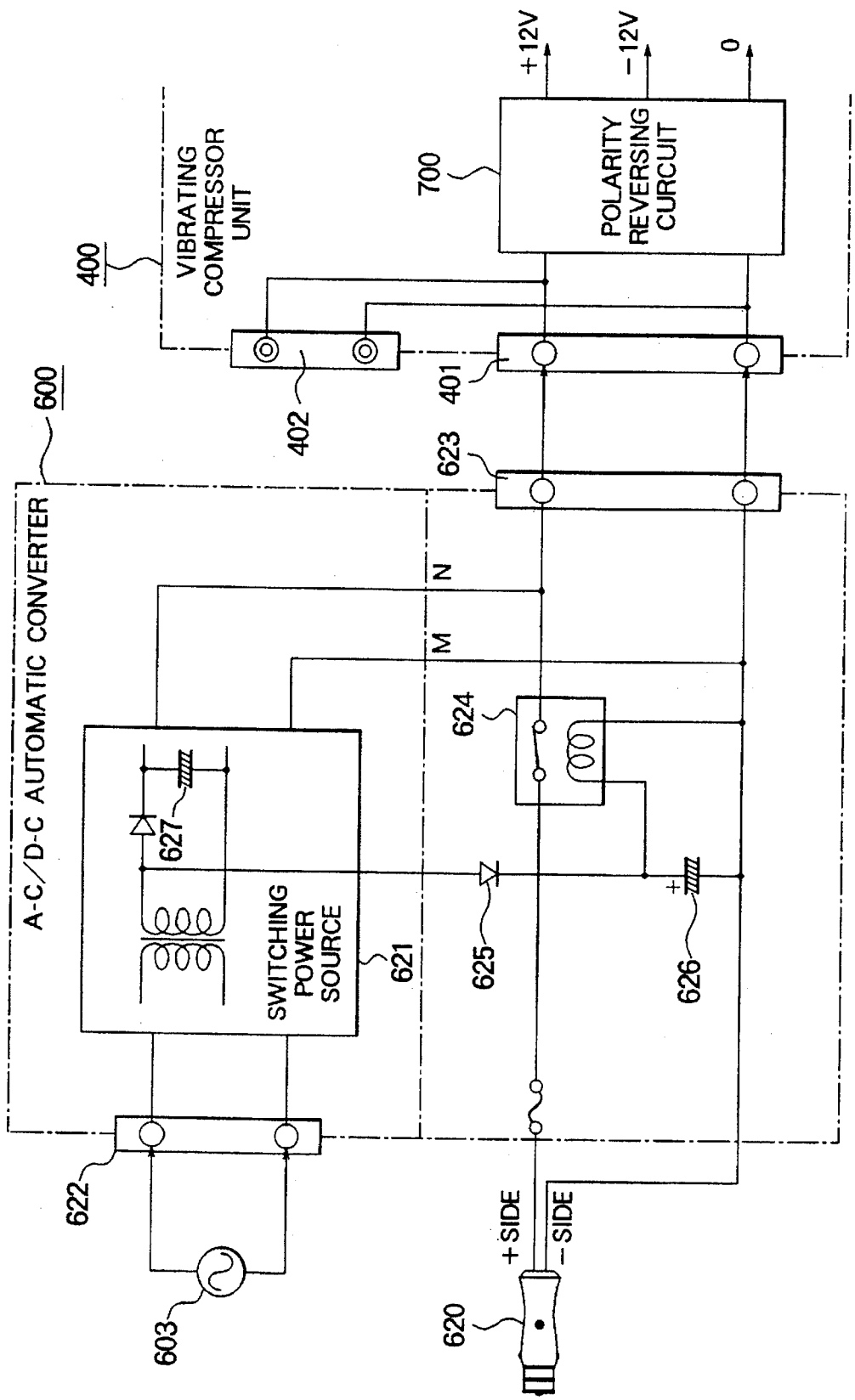
FIG. 6 shows the construction of an embodiment of the a-c/d-c automatic converter unit.

FIG. 6 shows the construction of an embodiment of the a-c/d-c automatic converter.

In the figure, the a-c/d-c automatic converter 600 comprises a switching power source 621, an a-c receptacle 622 for inputting a commercial a-c power 603 into the switching power source 621, a plug 623 for outputting the automotive battery voltage obtained from a cigarette-lighter plug 620 and the d-c voltage from the switching power source 621, a relay 624, a diode 625, and a capacitor 626.

The relay 624 has contact of the normally closed type. When the commercial a-c power 603 is connected to the a-c receptacle 622, and the relay 624 is energized via the diode 625, the normally-closed contact is opened to output the d-c voltage converted by the switching power source 621 to the plug 623 in preference to the d-c voltage from the cigarette-lighter plug 631.

Numeral 400 refers to a vibrating compressor unit having the power supply for vibrating compressors of this invention. The vibrating compressor unit 400 has a receptacle 401 and a terminal 402. When the plug 623 of the a-c/d-c automatic converter 600 is inserted into the receptacle 401 of the vibrating compressor unit 400, the commercial a-c power 603 or the battery d-c voltage obtained from the cigarette-lighter plug 620 is inputted to the polarity reversing circuit 700 where a voltage having a reversed polarity is generated.

A battery other than the automobile battery can be connected to the terminal 402 of the vibrating compressor unit 400.

When a d-c voltage is supplied to the vibrating compressor unit 400 using the commercial a-c power 603, the contact of the relay 624 is opened, as described above. Even when the contact is shortcircuited due to contact melting, only a 12-V d-c voltage is applied to the cigarette-lighter plug 620, giving no harm to human beings.

Furthermore, even when the automotive battery voltage drawn from the cigarette-lighter plug is supplied to the vibrating compressor unit 400, no voltage is applied to the a-c receptacle 622, giving no harm to human beings.

When the vibrating compressor unit 400 is a-c driven using the commercial a-c power 603, the capacitor 627 in the switching power source 621 smoothes the d-c voltage of the switching power source 621, but when the vibrating compressor unit 400 is d-c driven using the cigarette-lighter plug 620, the capacitor 627 can smooth the d-c voltage of the cigarette-lighter plug 620.

The a-c/d-c automatic converter 600 may be divided by two-dot chain lines as shown in the figure so that M and N can be connected to the receptacle 401 or the terminal 402 of the vibrating compressor unit 400. By doing so, the construction of the a-c/d-c automatic converter 600 can be simplified.

Figure 7:
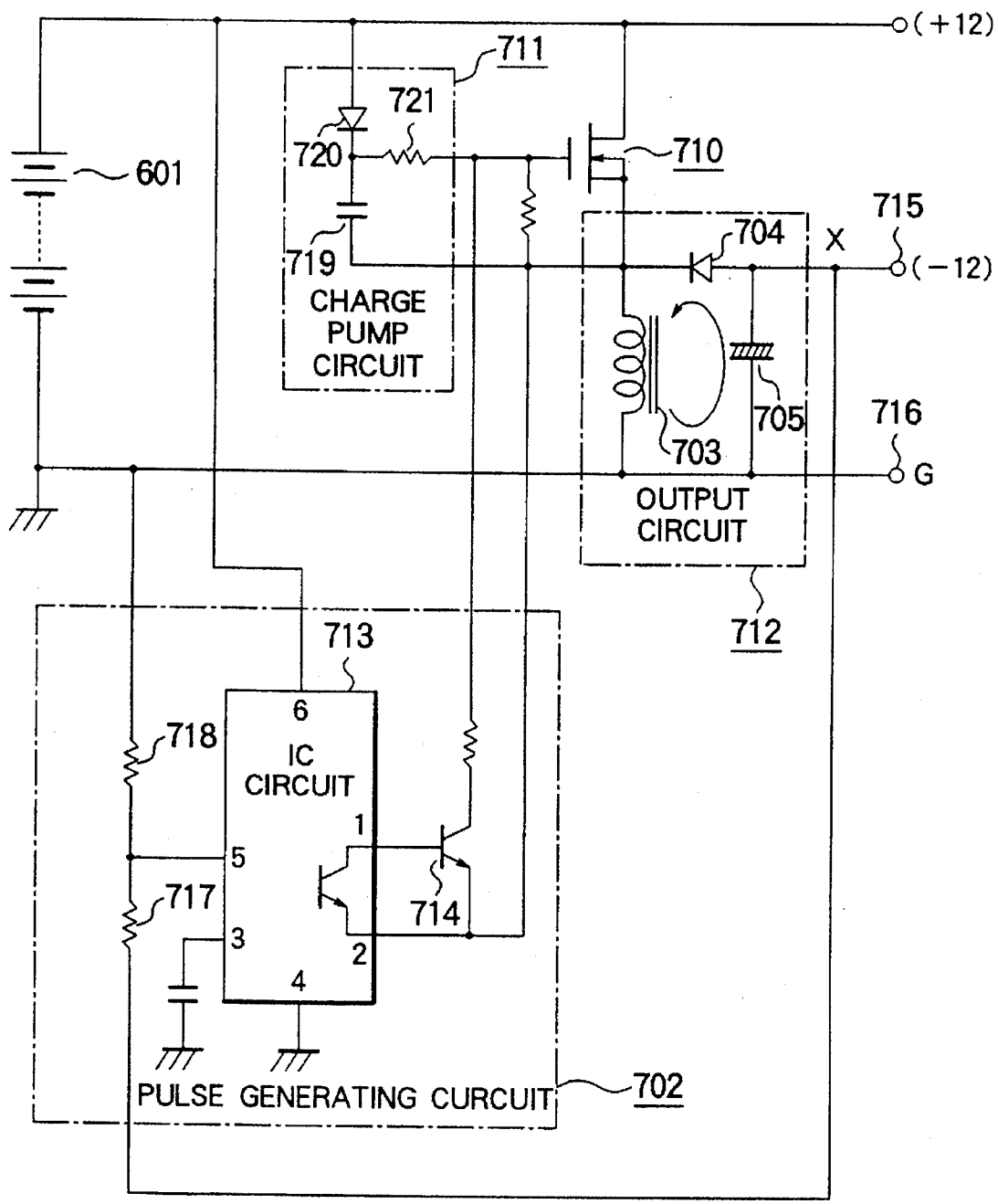
FIG. 7 shows the construction of another embodiment of the polarity reversing circuit.

FIG. 7 shows the construction of another embodiment of the polarity reversing circuit.

The polarity reversing circuit shown in the figure is of a construction in which an N-channel MOS-FET (hereinafter referred to as FET) 710 is used.

When the FET 710 is turned on, energy is accumulated in a choke coil 703 of an output circuit 712. At this time, a Darlington-connected transistor 714 in a pulse generating circuit 702 is turned off.

When pulses for turning on the transistor 714 are outputted from an IC circuit (switching regulator IC) 713, the FET 710 is turned off. At this time, a current is caused to flow in the direction shown by an arrow in the output circuit 712 by the energy accumulated in the choke coil 703, and the capacitor 705 is charged, with the terminal 716 being positive and the terminal 715 being negative. Thus, the voltages divided by the resistors 717 and 718 are applied to Pin Terminal No. 5 of the IC circuit 713, and after the lapse of a predetermined time, the IC circuit 713 turns off the transistor 714. At this time, a voltage as the sum of the voltage charged in the capacitor 719 in the charge pump circuit 711 and the voltage from the battery 601 via the diode 720 is applied to the gate of the FET 710 via the resistor 721. In other words, a gate voltage $V_{GS}$ necessary for sufficiently turning on the FET transistor 710 is maintained. Thus, the FET transistor 710 is turned on again, and energy is accumulated in the choke coil 703 of the output circuit 712.

Since the same process is repeated thereafter, voltages having reversed polarities of the battery 601 are outputted to both ends, that is, the terminals 715 and 716 of the capacitor 705.

The voltage of this output voltage can be changed to any value by changing the oscillation frequency of the pulse generating circuit 702.

FIG. 8 shows the construction of another embodiment of this invention.

Since the vibrating compressor 4, the battery 601, the polarity reversing circuit 700, and the inverter 5 in the figure are the same as those shown in FIG. 4, the detailed description thereof is omitted.

The control section 1 has the frequency following circuit 100 and the inverter control circuit 200. The inverter control circuit 200 outputs a control signal for alternately turning on the FETs 503 and 504 of the inverter 5. At this time, the frequency following circuit 100 generates from the inverter 5 an a-c voltage of a frequency following the resonance frequency of the vibrating compressor 4 via the inverter control circuit 200.

The shunt resistor 301 is used to detect a current flowing in the vibrating compressor 4 when the FET transistor 504 is driven, and a negative a-c voltage is applied to the vibrating compressor 4.

The inverter control circuit 200 has a frequency-divider flip-flop circuit 203, and drivers 204 and 205, and is designed to halve the frequency oscillated by the variable oscillator 101, which will be described later, into half-periods by the flop-flop circuit 203, and controls so as to alternately turn on the FETs 503 and 504 by the drivers 204 and 205 during the period when the half-period pulses are outputted. The drivers 204 and 205 may be designed to control the FET transistors 503 and 504 by means of PWM control, for example.

The frequency following circuit 100 comprises a variable oscillator 101, a period dividing circuit 120, an error amplifying circuit 121, two peak detecting circuit 122 and 123, electronic switches 124 and 125, an amplifying circuit 126, a capacitors 111 and 115, and resistors 112 and 116.

As described above, the variable oscillator 101 can change the oscillation frequency thereof by a time constant of the resistors 112 and 116 and the capacitor 111. The oscillation frequency is inputted into the flip-flop circuit 203 and the period dividing circuit 120 of the inverter control circuit 200. One period of the oscillation frequency of the variable oscillator 101 is divided in the period dividing circuit 120 into a predetermined ratio at which the preceding time is longer than the succeeding time, and the electronic switches 124 and 125 are closed at the preceding and succeeding time to acquire the current flowing in the shunt resistor 301 in synchronization with the on (conduction) time of the FET 504. The peak of the waveform of each current acquired via the electronic switches 124 and 125 is detected by the peak detecting circuits 122 and 123, the detected two peaks are compared in the error amplifying circuit 121, and the oscillation frequency of the variable oscillator 101 is changed in accordance with the difference between the two peaks.

Though not shown in FIG. 8, a battery monitor circuit for monitoring a voltage drop in the battery 601 and a thermo-control circuit for controlling the temperature inside the refrigerator are provided. When the voltage of the battery 601 falls below a predetermined voltage, the battery monitor circuit, in conjunction with the polarity reversing circuit 700, stops the operation of the control section 1 to interrupt the power supply from the battery 601. When the temperature inside the refrigerator falls below a predetermined temperature, the thermo-control circuit, in conjunction with the polarity reversing circuit 700, stops the operation of the control section 1 to interrupt the power supply from the battery 601, saving the power of the battery 601.

Now, the operation of the power supply for vibrating compressors of this invention having the aforementioned construction will be described, referring to the operating waveform diagram of FIG. 9a–9l.

The variable oscillator 101 is designed so that when the designed resonance frequency of the vibrating compressor 4 is 50 Hz, for example, pulses of a frequency in the range from the lower limit of 45×2 Hz to the upper limit of 55×2 Hz are generated. The range of oscillation frequency is determined by the time constant CR of the capacitance C of the capacitor 111 and the resistance R of the resistor 112 (when viewed from the variable oscillator 101) connected to the variable oscillator 101, as described above.

The frequency generated by the variable oscillator 101 is halved by the flip-flop circuit 203 into half-periods. During the period when a pulse of a half-period is outputted, the FET 503 is driven by a drive signal shown in FIG. 9b generated by the driver 204, and the FET 504 is driven by a drive signal shown in FIG. 9c generated by the driver 205. Consequently, the FETs 503 and 504 are alternately turned on, and thereby the inverter 5 generates an a-c voltage shown in FIG. 9d, which is fed to the vibrating compressor 4.

A current having a waveform shown in FIG. 9e flows in the vibrating compressor 4 as the FETs 503 and 504 are alternately turned on. Of this current, a current portion (FIG. 9f) flowing in the vibrating compressor 4 when the FET 504 is turned on is detected by the shunt resistor 301 and appropriately reversed and amplified in the amplifying circuit 126.

The oscillation frequency generated by the variable oscillator 101 is inputted to the period dividing circuit 120, in which one period of the oscillation frequency of the variable oscillator 101 is divided into a predetermined ratio where the preceding time is longer than the succeeding time. The electronic switch 124 is turned on by the preceding time shown in FIG. 9 outputted from the terminal A of the period dividing circuit 120, while the electronic switch 125 is turned on by the succeeding time shown in FIG. 9g outputted from the terminal B of the period dividing circuit 120.

A current waveform shown in FIG. 9i corresponding to the aforementioned preceding time is acquired via the electronic switch 124 from the current flowing in the vibrating compressor 4, which is reversed and amplified by the amplifying circuit 126, and inputted to the peak detecting circuit 122. Similarly, a current waveform shown in FIG. 9j corresponding to the aforementioned succeeding time is acquired via the electronic switch 125, and inputted to the peak detecting circuit 123.

In the peak detecting circuits 122 and 123, the maximum peaks of the current waveforms inputted thereto are obtained, and compared in the error amplifying circuit 121 based on any one of the maximum peak, that obtained in the peak detecting circuit 122, for example. The error amplifying circuit 121 outputs a control signal that reduces the difference between the two maximum peaks to zero. This control signal charges the capacitor 115.

If the charging amount in the capacitor 115 charged by the control signal from the error amplifying circuit 121 is low, and the voltage on the point Y at which the capacitor 115 and the resistor 116 are connected becomes low, the time constant CR described in reference to the variable oscillator 101 changes. As a result, the oscillation frequency of the variable oscillator 101 rises accordingly, and a control signal that reduces the difference between the maximum peaks inputted to the error amplifying circuit 121 to zero is outputted. Thus, the feedback system is stabilized, by causing the frequency of an a-c voltage driving the vibrating compressor 4 to follow the resonance frequency of the vibrating compressor 4. Conversely, when the voltage at the connecting point Y becomes high, the oscillation frequency generated by the variable oscillator 101 falls to a level agreeing with the resonance frequency of the vibrating compressor 4.

Figure 10E:
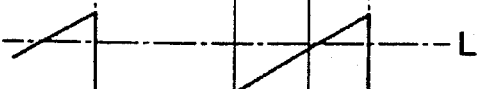
FIG. 10e is a diagram explaining the detection of a maximum peak in a wave form.

FIG. 10a–10g are diagrams of assistance in explaining the detection of the maximum peak of each waveform. As described above, a half-period corresponding to one period of the oscillation frequency of the variable oscillator 101 is divided into a predetermined ratio where the preceding time is longer than the succeeding time, and the currents flowing in the vibrating compressor 4 in the preceding and succeeding time are acquired so that two maximum peaks can be detected for the preceding and succeeding time with certainty even at high frequencies where a peak in the preceding time appears after the central point (FIG. 10D). Thus, the frequency of an a-c voltage driving the vibrating compressor 4 can be caused to agree with the resonance frequency of the vibrating compressor 4.

FIG. 10a shows the case where the drive frequency of the vibrating compressor 4 is the optimum frequency at which the maximum peak in the preceding time is almost equal to the maximum peak in the succeeding time. At this time, the efficiency of the vibrating compressor 4 is close to the maximum, as described above, and the current value becomes the minimum (Japanese Published Unexamined Patent Application No. Sho-61(1986)-173676).

FIG. 10b shows the case where the drive frequency of the vibrating compressor 4 is low, and C of the figure shows the case where the drive frequency of the vibrating compressor 4 is high. In the case of B, a control signal that increases the oscillation frequency of the variable oscillator 101 is outputted from the error amplifying circuit 121 so as to obtain a waveform as shown in FIG. 10a, as described above. In the case of FIG. 10c, on the other hand, a control signal that reduced the oscillation frequency of the variable oscillator 101 is outputted from the error amplifying circuit 121 so as to obtain a waveform as shown in FIG. 10a of the figure.

FIG. 10e shows for reference the state where one period of the oscillation frequency of the variable oscillator 101 is halved in such a manner that the preceding time FIG. 10g is longer than the succeeding time FIG. 10f by setting the level to L.

Even if the resonance frequency of the vibrating compressor 4 changes due to changes in load, etc., the vibrating compressor 4 can be driven at he highest efficiency because an oscillation frequency following the resonance frequency is generated by the variable oscillator 101, and the FETs 503 and 504 in the inverter 5 are alternately turned on via the inverter control circuit 200.

A voltage detecting circuit 8 shown in FIG. 8 is constructed so that when the power-source voltage increases due to the overcharge of the battery 601, for example, the voltage detecting circuit 8 detects the power-source voltage to reduce the output pulse width of the variable oscillator 101 and the duration when the FETs 503 and 504 are alternately turned on, thereby preventing the valve hitting phenomenon in the vibrating compressor 4, caused by an excessively extended piston stroke.

An atmosphere detecting circuit 9 detects the ambient temperature in the refrigerator to reduce the output pulse width of the variable oscillator 101 and the duration when the FETs 503 and 504 are alternately turned on, thereby preventing the valve hitting phenomenon in the vibrating compressor 4, caused by an excessively extended piston stroke.

FIG. 11 is a circuit diagram illustrating a more specific embodiment of FIG. 8, and FIG. 12 is a circuit diagram showing specific embodiments of the frequency following circuit, battery monitor circuit and thermo-control circuit used in FIG. 11.

In FIGS. 11 and 12, a polarity reversing circuit 700 as shown in FIG. 7 is constructed using an FET 1. The polarity reversing circuit 700 comprises, in addition to the FET 1, a choke coil 703, a diode D3, an operational amplifier 132 in an IC2 (TL494, for example), a capacitor C5, resistors R8 through R10, R14 and R15, and generates a negative −12-V voltage on the anode side of the diode D3, as described in reference to FIG. 7. Since the FET 1 is used as a switching element, the drive power for the FET 1 is obtained from a charge pump circuit consisting of a diode D1, a resistor R1, a constant voltage diode ZD1 and a capacitor C1. That is, the gate side of the FET 1 is kept at a voltage +12-V (voltage of the battery 601) higher with respect to the source of the FET 1, which is assumed to be a temporary ground. When the FET 1 is turned off, the voltage of the source becomes negative, conducting the diode D1 to charge the capacitor C1. When the FET 1 is turned on, the source voltage rises up to +12 V, but the gate side is always kept at a voltage +12 V higher than the source voltage due to the voltage charged in the capacitor C1.

The gate voltage of the FET 1 is driven via a high-speed photo-coupler IC1 (TLP550, for example). The drive circuit comprising transistor TR1 and TR2, a diode D2, a capacitor C2, resistors R3 through R7 is a commonly known high-speed circuit and controlled by a transistor 131 in the IC2 (TL494, for example).

The resistors R14 and R15 detect the reversed output voltage $V_{out}$ to control the pulse width generated in the FET 1 so that the sum of the detected voltage $R15 \cdot V_{out}/(R14+R15)$ and the internal reference voltage ($V_{ref}$) appearing on Pin No. 14 of the IC2 is always kept at 0 V.

Since $V_{out}=-(1+R14/R15) \cdot V_{ref}$ is derived from $V_{ref}+R15 \cdot V_{out}/(R14+R15)$, a −12-V voltage having the same absolute value as the voltage of the battery 601 can be produced by properly selecting the resistors R14 and R15. The oscillation frequency of the IC2 is determined by the time constant of the capacitor C3 and the resistor R13 and set at approximately 50 kHz.

The FETs 2 and 3 for feeding a-c voltage to the vibrating compressor 4 form what is called an SEPP circuit. Because an about 12-V voltage is generally applied to the source of an FET as the gate voltage, power voltages of different systems are prepared for FETs.

That is, the power of the FET 2 is obtained from a charge pump circuit consisting of the diode D4, the resistor R16, the constant-voltage diode ZD2 and the capacitor C7. In other words, the gate side obtains a voltage +12 V higher than the source of the FET 2. Since the drain-source voltage of the FET 2 becomes 24 V because the FET 3 is turned on when the FET 2 is turned off, the source of the FET 2 is kept at +12 V by connecting the constant-voltage diode ZD2. Furthermore, the charge pump circuit, together with the photo-coupler IC4-2/2 (TLP521, for example) and the resistor R19, forms the driver for the FET 2, which corresponds to the driver 204 in FIG. 8.

The power of the FET 3 is obtained from a charge pump circuit consisting of the diode D5 and the capacitor C6. That is, the gate side obtains a voltage +12-V higher than the source of the FET 3. In other words, the power for the FET 3 does not exceed +12 V, requiring no constant-voltage diode because it is fed from the ground via the diode D5 when the FET 3 is turned on. The charge pump circuit, together with the photo-coupler IC4-1/2 and the resistor R20, forms the driver for the FET 3, which corresponds to the driver 205 in FIG. 8.

The gate drive signals for the FETs 2 and 3 are inputted via the photo-couplers IC4-2/2 and -1/2, both of which emit light as the transistors 133 and 134 in the IC 3 (SG3524, for example) corresponding to the variable oscillator 101 and the flip flop circuit 203 of FIG. 8 are alternately turned on and off. Since their operating frequency is as low as 50 to 60 Hz, they are driven directly by the transistors in the general-purpose photo-couplers IC4-2/2 and -1/2.

The transistors in the photo-couplers IC4-2/2 and -1/2 are prevented from being turned on simultaneously by adapting to provide a predetermined pause period by setting the resistors R22 and the thermistor TH2 to appropriate values. The oscillation frequency of the IC 3 is determined by the time constant of a resistor R21 and a capacitor C8 connected to Pin Nos. 6 and 7, respectively, but can be changed by changing the time constant of the resistor R21 and the capacitor C8 by inputting a separate signal from the frequency following circuit to Pin No. 6 so as to initiate frequency following, as will be described later. That is, the oscillation frequency of the IC 3 can be changed by providing a current mirror circuit that equalizes the current flowing in a capacitor connected to Pin No. 7 and the current flowing in a resistor connected to Pin No. 6, and controlling the current flowing from Pin No. 6. The resistor R21 and the capacitor C8 correspond to the resistor 112 and the capacitor 111 in FIG. 8.

As a saw tooth wave as shown in FIG. 9a appears on Pin No. 7 of the IC 3, the aforementioned transistors 133 and 134 alternately turned on and off, and gate drive signals for the FETs 2 and 3 as shown in FIG. 9b and 9c are generated in synchronism with the saw tooth wave.

The current flowing in the vibrating compressor 4 is detected by a detecting resistor R24 connected to the source side of the FET 3 when a negative a-c voltage is fed. The detecting resistor R24 corresponds to the shunt resistor 301 shown in FIG. 8. The current on the negative voltage side is detected because the negative voltage, which has been stabilized in the polarity reversing circuit at the preceding stage, is relatively immune to ripple voltage.

In FIG. 12, numeral 100 corresponds to that shown in FIG. 8, 136 refers to a battery monitor circuit, and 137 to a thermo-control circuit, respectively.

In the figure, the detected current detected by the detecting resistor R24 is amplified appropriately by the operational amplifier OP1-1 and inputted to the analog switches SW1 and SW2. A circuit formed by the operational amplifier OP1-1 and the resistors R27 to R30 corresponds to the amplifying circuit 126 shown in FIG. 8.

The saw tooth wave shown in FIG. 9a outputted from Pin No. 7 of the IC 3, on the other hand, is inputted to the operational amplifier OP2-4 and compared with a reference voltage which is divided by the resistors R43 and R44. The operational amplifier OP2-4 divides a half-period of one ON-OFF period outputted from Pin Nos. 12 and 13 of the IC 3 into a predetermined ratio where the preceding time is longer than the succeeding time by setting the resistors R43 and R44 to appropriate values. The preceding and succeeding time is inputted to the aforementioned analog switches SW1 and SW2 so as to turn on the analog switches SW1 and SW2 for their respective time intervals.

Consequently, the waveform shown in FIG. 9i among the current waveforms detected by the detecting resistor R24 is acquired during the ON time of the analog switch SW1, and the waveform shown in FIG. 9j is acquired by the analog switch SW2. A circuit formed by the operational amplifier OP2-4, the transistor TR5, and the resistors R41 through R46 corresponds to the period dividing circuit 120 in FIG. 8, and the analog switches SW1 and SW2 to the electronic switches 124 and 125 in FIG. 8, respectively.

A circuit formed by a diode D6, a capacitor C12 and a resistor R35, and a circuit formed by a diode D8, a capacitor C13 and a resistor R36 hold maximum peaks; the former circuit holding the maximum peak of the waveform shown in FIG. 9i acquired by the analog switch SW1, and the latter circuit holding the maximum peak of the waveform shown in FIG. 9j acquired by the analog switch SW2. Using the maximum peak held by the circuit consisting of the diode D6, the capacitor C12 and the resistor R35 as the reference value, the maximum peaks held by the two circuits are compared in an operational amplifier OP1-2 so as to output a voltage corresponding to the difference.

Since the voltage corresponding to the difference is of a pulse shape, it is smoothed by a smoothing circuit comprising a capacitor 11 and a resistor R40. The smoothed voltage is applied to the diode D12 via a buffer operational amplifier OP2-3, and thereby the value of current flowing in a resistor R61 and the current flowing in the resistor R21 change. That is, the time constant of the resistors R21 and R61 and the capacitor C8 substantially changes, and the slope, that is, the oscillating period of the saw tooth wave shown in FIG. 9a outputted from Pin No. 7 also changes with the ON-OFF time of the transistors 133 and 134 in the IC 3.

The changes in the slope of the saw tooth wave outputted from Pin No. 7 of the IC 3 causes the output timing of the operational amplifier OP2-4 to change, and divide the half-period of one ON-OFF period outputted from Pin Nos. 12 and 13 of the IC 3 into a predetermined ratio where the preceding time is longer than the succeeding time, causing the peak acquiring time of the analog switches SW1 and SW2 to change.

The diode D12 is a clamp diode connected to prevent the oscillation frequency of the IC 3 from decreasing down to a level lower than needed as the voltage of the operational amplifier OP1-2 rises at the time when the power is turned on.

As is evident from the above description, a circuit formed by the diode D6, the capacitor C12, the resistor R35, and a circuit formed by the diode D8, the capacitor C13 and the resistor R36 correspond to the peak detecting circuits 122 and 123 in FIG. 8; a circuit formed by the operational amplifier OP2-3, the capacitor C11 and the resistors R37 through R40 corresponds to the error amplifying circuit 121 in FIG. 8; and the capacitor C8 and the resistor R21 correspond to the capacitor 111 and the resistor 112 in FIG. 8.

The operational amplifier 135 of the IC 3 causes the transistors 133 and 134 to alternately turn on and off. If the voltage of the battery 601 rises and exceeds the Zener voltage of the constant-voltage diode ZD3 for some reason, due to overcharge, for example, the constant-voltage diode ZD3 is turned on, as shown in FIG. 13. As a result, the potential on Pin No. 2 of the IC 3 rises.

FIG. 14 shows the state at this moment. The level L2 in FIG. 14A corresponds to the potential on Pin 2 of the IC 3, and rises as shown by a solid line. As the level L2 rises, the points at which the level L2 intersects the saw tooth wave, and as a result, the output pulse widths of the transistors 133 and 134, that is, the output pulse widths on Pin Nos. 12 and 13 of the IC 3 are reduced, as shown in FIG. 14B and 14C. Dotted lines in FIG. 14 show the state before the voltage rises.

This reduces the ON time width in which the FETs 2 and 3 are alternately turned on, lowering the supply voltage to the vibrating compressor 4. Thus, the valve hitting phenomenon in the vibrating compressor 4 is prevented.

When the voltage of the battery 601 is below a predetermined voltage, on the other hand, the constant-voltage diode ZD3 is turned off, and the potential on Pin No. 2 of the IC 3 is determined by the resistance ratio of the resistor R22 and the thermistor TH2.

The thermistor TH2 detects the ambient temperature of the refrigerator. As the ambient temperature of the refrigerator lowers, the resistance value of the thermistor TH2 rises, and the potential on Pin No. 2 of the IC 3, that is, the level L2 rises.

As a result, the output pulse widths on Pin Nos. 12 and 13 of the IC 3 are reduced, as in the above description. Thus, the valve hitting phenomenon of the vibrating compressor 4 is prevented even when the ambient temperature of the refrigerator lowers.

FIG. 15 is a diagram of assistance in explaining part of the construction of another embodiment of means for preventing the valve hitting phenomenon.

The construction shown in the figure is essentially the same as that shown in FIG. 8, except that the voltage of the battery 601 (more precisely, the voltage of the battery 601 as passed through the diode D1) is applied directly to the resistor R22. As the voltage of the battery 601 changes, the potential on Pin No. 2 of the IC 3, that is, the level L2 also changes. As the voltage of the battery 601 increases, the potential on Pin No. 2 of the IC 3 increases, and the level L2 in FIG. 14A rises. This prevents the valve hitting phenomenon in the vibrating compressor 4, as in the above description.

The battery monitor circuit 136 is connected to protect the battery 601 when the voltage thereof drops. When the voltage of the battery 601 falls below a predetermined voltage, the output of the operational amplifier OP2-1 becomes the H level, stopping the operation of the ICs 2 and 3. At this time, the drop of the battery voltage is displayed by lighting the lamp LED2.

The thermo-control circuit 137 stops the operation of the ICs 2 and 3 when the temperature inside the refrigerator rises above a temperature preset by a temperature setting variable resistor VR1. That is, when the thermistor TH1 for detecting the temperature in the refrigerator detects a temperature below the voltage preset by the temperature setting variable resistor VR1, the output of the operational amplifier OP2-2 becomes the L level, actuating the ICs 2 and 3. When the thermistor for detecting the temperature inside the refrigerator detects a temperature above the temperature preset by the temperature setting variable resistor VR1, the output of the operational amplifier OP2-2 becomes the H level, stopping the operation of the ICs 2 and 3 to save the power of the battery 601.

Since the operation of the circuits in the above construction is essentially the same as that in the construction shown in FIG. 8, except for the battery monitor circuit 136 and the thermo-control circuit 137, description of the operation is omitted here.

FIG. 16 shows the construction of another embodiment of this invention.

The embodiment shown in FIG. 16 has essentially the same construction as that shown in FIG. 4, except for part of the control section 1. That is, the frequency following circuit 100 in the control section 1 compares the mean values of currents flowing in the shunt resistor 301 in the half-period of one period of the oscillation frequency generated by the variable oscillator 101, and outputs a control signal to change the oscillation frequency of the variable oscillator 101 so that the difference becomes a predetermined value.

Since pulses of a frequency corresponding to the control signal is generated by the variable oscillator 101, an a-c voltage having a frequency following the changes in resonance frequency in accordance with changes in the load of the vibrating compressor 4 can be generated, permitting the vibrating compressor 4 to be driven at the highest efficiency.

Currents flowing at each half-period in the shunt resistor 301 are acquired the reversing circuit 113, and the analog switches 141 and 142, and the acquired currents are averaged in the mean value circuits 143 and 144. The arithmetic circuit 145 compares both mean values, and outputs a control signal that reduces the difference to a predetermined value.

Next, description will be made, referring to FIG. 17a–17e, which is a diagram of assistance in explaining the operating waveforms.

The variable oscillator 101 is preset so that when the designed resonance frequency of the vibrating compressor 4 is 50 Hz, a pulse frequency of 100 Hz, twice the 50-Hz resonance frequency, is oscillated FIG. 17a.

The variable oscillator 101 can change the oscillation frequency of 100 Hz, as noted earlier. The oscillation frequency of 100 Hz is determined by the time constant CR of the capacitance C of the capacitor 111 and the resistance R of the resistor 112 (when viewed from the variable oscillator 101) connected to the variable oscillator 101.

The flip-flop circuit of the frequency divider 201 halves 100 Hz of the oscillation frequency of the variable oscillator 101, and the output thereof Q and $\bar{Q}$ controls to alternately turn on the FETs 503 and 504 in the inverter 5 via each driver os the transistor control circuit 202.

Noting the FET 503, when the FET 503 is turned on (FIG. 17b), a current flowing in the vibrating compressor 4 is detected by the shunt resistor 301 (FIG. 17c).

Since 100-Hz pulses generated by the variable oscillator 101 turn on the analog switch 141 and the analog switch 142 via the reversing circuit 113, the current flowing in the vibrating compressor 4 detected by the shunt resistor 301 is halved by the analog switches 141 and 142, and the current waveforms shown in FIG. 17d and 17e are inputted to the mean value circuits 143 and 144, respectively.

The current waveforms inputted to the mean value circuits 143 and 144 are averaged, and inputted to the arithmetic circuit 145. The arithmetic circuit 145 compares the averaged current waveforms, using as the reference value any one thereof (the averaged current waveform inputted to the mean value circuit 143, for example). The arithmetic circuit 145 outputs a control signal that makes the difference between the inputted current waveforms a predetermined value, and charges the capacitor 115.

If the charging amount charged in the capacitor 115 by the control signal from the arithmetic circuit 145 is low, and the voltage at the point Y at which the capacitor 115 and the resistor 116 are connected become lower, the aforementioned time constant CR changes. As a result, the oscillation frequency of the variable oscillator 101 becomes higher accordingly, a control signal that makes the difference between the current waveforms inputted to the arithmetic circuit 145 a predetermined value is outputted to stabilize the feedback system. That is, the oscillation frequency of the variable oscillator follows the resonance frequency of the vibrating compressor 4. Conversely, if the voltage at the connecting point Y becomes higher, the oscillation frequency of the variable oscillator 101 becomes lower, and control is effected so as to agree with the resonance frequency of the vibrating compressor 4.

As described above, since this invention has such a construction that pulses of a frequency following the resonance frequency of the vibrating compressor 4 is generated by the variable oscillator 101 so as to alternately turn on the FETs 503 and 504 in the inverter 5 via each driver of the frequency divider 201 and the transistor control circuit 202, the vibrating compress or 4 can be driven at the maximum efficiency even when the load of the vibrating compressor 4 changes.

Aside from the embodiment described above, the same effects can be achieved by replacing the mean value circuits 143 and 144 in FIG. 16 with integration circuits so that inputted current waveforms are integrated by the integration circuits and inputted to the arithmetic circuit 145 so as to make the difference between the integrated values of the current waveforms inputted to the arithmetic circuit 145 a predetermined value.

FIG. 18 shows the construction of still another embodiment of this invention.

The embodiment shown in FIG. 18 has essentially the same construction as that shown in FIG. 4, except for part of the control section 1. That is, this embodiment is characterized in that the control section 1 has a mean value circuit 151, and a minimum current control circuit 150 in which the oscillation frequency of the variable oscillator 101 is controlled so as to minimize the mean value of the current flowing in the vibrating compressor 4 by gradually changing the oscillation frequency of the variable oscillator 101 at predetermined time intervals.

The minimum current control circuit 150 controls the oscillation frequency of the variable oscillator 101 so as to minimize the mean value of the current flowing in the vibrating compressor 4 by gradually changing the oscillation frequency of the variable oscillator 101 at predetermined time intervals.

In other words, the minimum current control circuit 150 is caused to effect control so that a frequency $f_4$ that minimizes the mean current I is oscillated by the variable oscillator 101 in FIG. 19 which is a characteristic diagram of an embodiment of the vibrating motor. At this time, or when a frequency $f_4$ that minimizes the mean current I is oscillated from t the variable oscillator 101, the efficiency of the vibrating compressor 4 reaches almost the maximum. That is, it is said that the maximum point of efficiency lies between the peak of delivery and the minimum current value. This characteristic has been experimentally elucidated after years of research by the present applicant.

In other words, the maximum efficiency can be accomplished by minimizing the current. Control is exercised therefore to minimize the current in this invention.

In the following, description will be made about a specific method of generating from the variable oscillator 101 a frequency $f_4$ that minimizes the mean current I in FIG. 18.

The variable oscillator 101 is preset so as to oscillate pulses of a frequency in a range from the lower limit of 45 Hz to the upper limit of 55 Hz when the designed resonance frequency of the vibrating compressor 4 is 50 Hz. The oscillation frequency in this range can be determined by the time constant CR of the capacitance C of the capacitor 111 and the resistance R of the resistor 112 (when viewed from the variable oscillator 101) connected to the variable oscillator 101.

Pulses of a frequency generated by the variable oscillator 101 effect control so as to alternately turn on the FETs 503 and 504 in the inverter 5 via each driver of the transistor control circuit 202.

Noting the FET 503, a current flowing in the vibrating compressor 4 is detected by the shunt resistor 301 when control is exerted so as to turn on the FET 503.

The current flowing in the vibrating compressor 4 detected by the shunt resistor 301 is amplified appropriately by the amplifier 152, and averaged by the mean value circuit 151 consisting of the capacitor 153 and the resistor 154.

The counter 155, on the other hand, counts pulses of about 1 kHz, for example, to close the analog switches 156 and 157 in the following sequence at a predetermined time intervals, once every 2 seconds, for example so that the mean current value averaged by the mean value circuit 151 is inputted to the arithmetic circuit 158.

That is, after the analog switch 157 is closed and, when the oscillation frequency of the variable oscillator 101 is $f_1$ at this time, a mean current $I_1$ averaged by the mean value circuit 151 is acquired by the arithmetic circuit 158. The counter 155 outputs to the transistor 159 a signal for increasing the oscillation of the variable oscillator 101 by 0.5 Hz, for example. This causes the variable oscillator 101 to oscillate an oscillation frequency $f_2=f_1+0.5$, and a mean current $I_2$ of the current flowing in the vibrating compressor 4 at this time is acquired by the mean value circuit 151. The counter 155 closes the analog switch 156. The arithmetic circuit 158 acquires this mean current $I_2$ via the analog switch 156, and compares the mean current $I_2$ with the mean current $I_1$.

In the following, description will be made, referring to the characteristic curves in FIG. 19. Since the mean current $I_1>$ the mean current $I_2$, the frequency that minimizes the mean current I of the current flowing in the vibrating compressor 4 lies in a region higher than the frequency $f_2$. After the lapse of a predetermined time, the counter 155 closes the analog switch 157, causes the arithmetic circuit 158 to acquire the mean current $I_2$ averaged by the mean value circuit 151 at the oscillation frequency $f_2$ of the variable oscillator 101, and then outputs to the transistor 159 a signal that increases the oscillation frequency of the variable oscillator 101 by 0.5 Hz. This causes the variable oscillator 101 to oscillate an oscillation frequency $f_3=f_2+0.5$, and as a result a mean current $I_3$ of the current flowing in the vibrating compressor 4 is acquired by the mean value circuit 151. The counter 155 closes the analog switch 156. The arithmetic circuit 158 acquires the mean current $I_3$ via the analog switch 156, and compares the mean current $I_3$ with the mean current $I_2$.

In the same manner, when a mean current $I_4$ averaged by the mean value circuit 151 at an oscillation frequency $f_4$ and s mean current $I_5$ averaged by the mean value circuit 151 at an oscillation frequency $f_5$ are compared in the arithmetic circuit 158, the output of the arithmetic circuit 158 is reversed and becomes the H level. That is, it is detected that a frequency that minimizes the mean current of the current flowing in the vibrating compressor 4 lies between the frequency $f_3$ and the frequency $f_5$.

The oscillation frequency of the variable oscillator 101 is returned to $f_4$ (or it may be $f_3$) by the reversed output of the H level in the arithmetic circuit 158.

Similarly, the counter 155 closes the analog switch 157 after the lapse of a predetermined time, and causes the arithmetic circuit 158 to acquire a mean current $I_4$ averaged in the mean value circuit 151 at an oscillation frequency $f_4$ of the variable oscillator 101. After that, the counter 155 outputs to the transistor 159 a signal that increases the oscillation frequency of the variable oscillator 101 by 0.5 Hz. This causes the variable oscillator 101 to oscillate an oscillation frequency of $f_5=f_4+0.5$, and a mean current $I_5$ of the current flowing in the vibrating compressor 4 is obtained in the mean value circuit 151. The counter 155 closes the analog switch 156, and the arithmetic circuit 158 acquires the mean current $I_5$ via the analog switch 156, and compares the mean current $I_4$ with the mean current $I_5$.

Even when the load of the vibrating compressor 4 changes, causing the characteristic curves in FIG. 19 to change, a frequency that minimizes the mean current I of the current flowing in the vibrating compressor 4 is automatically followed, and the oscillation frequency of the variable oscillator 101 is set so that the mean current I is always kept at the minimum. Thus, the vibrating compressor 4 can be kept driven at the maximum efficiency.

The minimum current control circuit 150 in FIG. 18 may be of any type of construction, or of a type using a microprocessor so long as it gradually changes the oscillation frequency of the variable oscillator 101, compares the mean currents of the current flowing in the vibrating compressor 4 at that time, and automatically sets in the variable oscillator a frequency that minimizes the mean current I.

The detecting method may be such that a current flowing in the vibrating compressor 4 is detected with an a-c component of the vibrating compressor 4, and rectified to convert it into a mean current.

FIG. 20 shows the construction of still another embodiment of this invention.

In FIG. 20, the anode side of the diode 181 in the charge pump circuit 180 is grounded. Two control signals outputted from the IC circuit 185 are inputted in each gate of the FETs 503 and 504, after one of the two control signals is reversed by the transistor 184, to alternately turn on and off the FETs 503 and 504.

Assuming that a control signal that turns off the FET 503, for example, and turns on the FET 504 is outputted from the IC circuits 185 and the transistor 184, the current flowing in the vibrating compressor 4 flows in the direction shown by an arrow in the figure, and the capacitor 182 in the charge pump circuit 180 is charged at 12 V in the polarities shown in the figure, that is, with the cathode side of the diode 181 turned to +, and the source side of the FET 503 to −.

When control signals outputted from the IC circuit 185 and the transistor 184 are reversed, and a control signal that turns on the FET 503 and turns off the FET 504 is outputted, the voltage charged in the capacitor 182 is applied to the gate of the FET 503 via the resistor 183.

Since the anode side of the diode 181 in the charge pump circuit 180 is grounded, no additional voltage is applied from the diode 181 to the already charged capacitor 182. That is, the gate-source of the FET 503 is driven by the voltage charged in the capacitor 182, and no more voltage is applied to the FET 503. Thus, the FET 503 can be of a low dielectric strength.

Since the operation of other circuits is essentially the same as that in FIG. 4, description about it is omitted.

FIG. 21 shows the construction of still another embodiment of this invention.

The embodiment shown in FIG. 21 detects that the counter electromotive force generated in a drive coil has been recovered in the vicinity of 0 V, and supplies drive current to the drive coil from the outside at that timing to ensure efficient operation.

In the figure, the vibrating compressor 4 is connected between the source of the FET 510 and the ground, and the drain of the FET 510 is connected to the positive side (+12 V) of the battery 601. The gate of the FET 510 is connected to the driver 210, and to the gate voltage circuit 220, from which the gate voltage $V_{cc}2$ of about 12 V is supplied.

The driver 210 receives a pulse signal outputted by the timer IC 160 (NE555, for example), based on which the gate signal of the FET 510 is generated. The power voltage $V_{cc}1$ of +7.5 V is supplied from the stabilizing circuit 161 to the timer IC 160. The timer IC 160 operates as an astable multivibrator, and the ON-OFF time of the output is determined by the resistors R3 and R4, and the capacitor C4 connected to Pin Nos. 6 and 7, as shown in the figure, and is normally expressed by the ON time of T1=0.693(R3+R4)·C4, and the OFF time of T2=0.693·R4·C4.

Pin No. 5 of the timer IC 160 is connected to the timer forced actuating circuit 162 that forcibly reverses the OFF output on Pin No. 3 at a certain timing, as will be described.

The battery monitor circuit 136 that protects the battery 601 and the thermo-control circuit 137 that keeps the temperature inside the refrigerator constant are connected to the driver 210. Numeral 163 refers to a counter electromotive force clamp circuit for clamping the counter electromotive force generated in the vibrating compressor 4.

The operation of the power supply for vibrating compressors of this invention having the aforementioned construction will be described in the following.

The FET 510 is a source follower in which a voltage about 12 V higher than the potential of the source is provided, after stabilized by the gate voltage circuit 220, as a voltage that is applied to the gate-source, after stabilized by the gate voltage circuit 220. That is, when the FET 510 is turned off, the counter electromotive force shown in FIG. 22 (3) is generated on the source side of the FET 510 by the inductance of the vibrating compressor 4. At this time, the diode D1 is conducted, charging the capacitor C3 to maintain the power voltage $V_{cc}1$. At this time, the power voltage $V_{cc}2$ is maintained at about 12 V by the constant-voltage diode ZD1.

Figure 22:
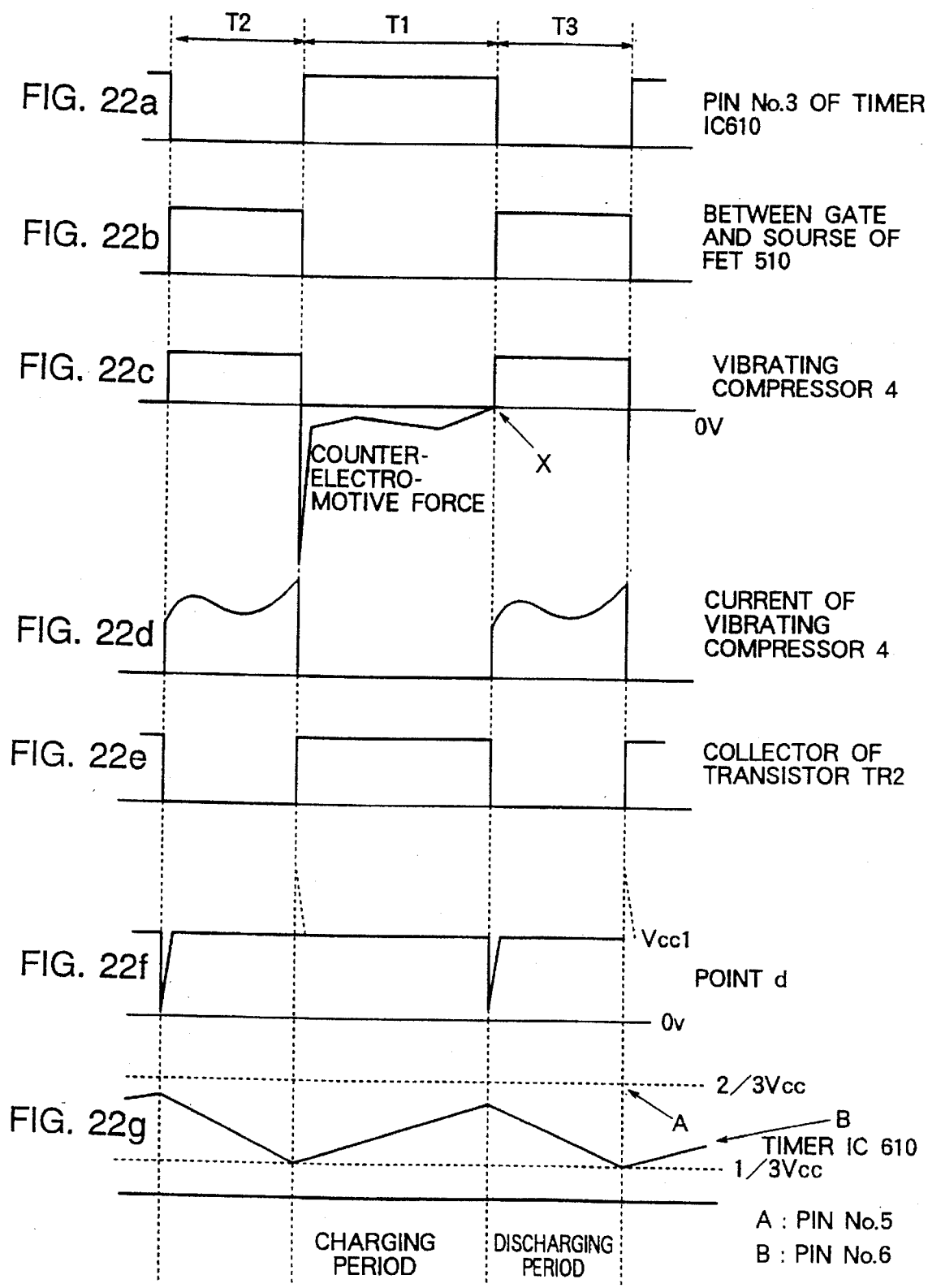

In the following, description will be made, referring to FIG. 22, which is a time chart of assistance in explaining the operation.

When the output on Pin No. 3 of the timer IC 160 becomes L (FIG. 22a), a transistor in the photo-coupler IC2 (TLP512, for example) is turned on via the normally turned-on transistor TR3, the voltage $V_{cc}2$ of about 12 V is applied to the gate of the FET 510 (FIG. 22b), turning on the FET 510. The voltage of the battery 601 is therefore applied to the vibrating compressor 4 (FIG. 22c). The optimum time in which voltage is applied to the vibrating compressor 4 is empirically determined by the construction of the vibrating compressor 4, and set at the OFF time T2.

After the lapse of the OFF time T2, the output on Pin No. 3 of the timer IC 160 become H (FIG. 22a), and the FET 510 is turned off. At this time, a counter electromotive force having a deep negative voltage is generated by the inductance of the vibrating compressor 4, as shown in FIG. 22c. This counter electromotive force is gradually recovered and almost exceeds 0 V. The time up to the zero-cross time (the point X in FIG. 22c) changes with pressure and temperature conditions of the vibrating compressor 4. It is empirically known that the best operating efficiency can be accomplished by applying the next pulse at the point X shown in FIG. 22c. The timer IC 160 is therefore actuated at this timing, and the output of the timer IC 160 is forcibly reversed at the timing where the counter electromotive force is about to exceed 0 V from H to L, that is, from the ON time T1 to the OFF time T2.

Since the source of the FET 510 is kept at negative potential (FIG. 22c) by the counter electromotive force during the period when the FET 510 is turned off, the base of the transistor TR2 in the timer forced actuating circuit 162 is reverse-biased, leaving the transistor TR2 in the OFF state. As the counter electromotive force is recovered and the source side of the FET 510 is about to exceed 0 V, the transistor TR2 is turned on at that timing, and the point c on the collector side is reversed from H to L (FIG. 22 (5)). The change from H to L at the point c on the collector side is differentiated by the differentiation circuit consisting of the resistor R6 and the capacitor C6, the trigger waveform shown in FIG. 22 (6) appears at the point d on the cathode side of the diode D3. The trigger waveform shown by an upper dotted line that appears when the transistor TR2 is turned off and the point c on the collector side changes from L to H disappears as it is clamped to $V_{cc}1$ by the diode D4.

The aforementioned trigger waveform differentiated by the differentiation circuit formed by the resistor R6 and the capacitor C6 is inputted on Pin No. 5 of the timer IC 160. The voltage on Pin No. 5 of the timer IC 160 serves as the input to control the ON time T1 outputted from Pin No. 3, and the voltage inputted to Pin No. 5 is compared with the voltage charged in the capacitor C4 on Pin No. 6. When the voltage on Pin No. 5 is lower than that on Pin No. 6, control is exerted so that the output on Pin No. 3 is reversed. Pin No. 5 is normally set at ⅔ of the power voltage $V_{cc}$, and higher than the voltage charged in the capacitor C4 inputted on Pin No. 6 (FIG. 22 (7)). As shown in FIG. 22 (7), when the aforementioned trigger waveform is inputted, the voltage on Pin No. 5 becomes lower than the voltage charged in the capacitor C4 on Pin No. 6 before the voltage on Pin No. 6 reaches (⅔)$V_{cc}$. This forcibly reverse the output on Pin No. 3 from H to L. That is, the ON time T1 on Pin No. 3 is forcibly discontinued, actuating the OFF time T2 (FIG. 22 (1)).

The OFF time T2 at this time becomes shorter than T2=0.693·R4·C4 but an almost constant OFF time can be obtained since the OFF time T2 begins with a voltage lower than (⅔)$V_{cc}$. The value of the OFF time T2 in this invention is determined, taking into account the fact that the OFF time T2 becomes shorter.

The levels of (⅓)$V_{cc}$ and (⅔)$V_{cc}$ in FIG. 22g represent the levels at which the voltage on Pin No. 3 actuates the On time and the OFF time when the charged voltage in the capacitor C4 on Pin No. 5 reaches these levels in a state where Pin No. 5 of the timer IC 160 is not used.

The operational amplifier OP1 of the battery monitor circuit 136 compares a voltage obtained by dividing the voltage of the battery 601 by the resistors R20 and the R23 with the voltage $V_{cc}1$ stabilized by the stabilizing circuit 161. When the voltage of the battery 601 is in the normal range, the output of the operational amplifier OP1 is H, turning on the transistor TR3 via the constant-voltage diode ZD3 of the driver 210, putting the vibrating compressor 4 into the operating state. As the battery 601 drops below a predetermined voltage, the output of the operational amplifier OP1 becomes L, turning off the transistor TR3. This causes the light-emitting operation of a diode in the photo-coupler IC2 to discontinue, stopping the operating state of the vibrating compressor 4.

The operational amplifier OP2 of the thermo-control circuit 137 always compares the voltage divided by the resistor R19 and the thermistor TH1 with the reference voltage obtained by dividing the stabilized voltage $V_{cc}1$ by the resistors R20 and R21. The resistance of the thermistor TH1 rises when the temperature falls. As the temperature inside the refrigerator reaches a preset temperature, therefore, the output of the operational amplifier OP2 becomes L, turning the base of the transistor TR3 to the L level to turn off the transistor TR3 regardless of the output state of the operational amplifier OP1 of the battery monitor circuit 136. This causes the light-emitting operation of the diode in the photo-coupler IC2 to stop, turning off the FET 510. As the temperature inside the refrigerator rises, the output of the operational amplifier OP2 is reversed to H. If the output of the operational amplifier OP1 is H, control is then exerted by the pulse signal outputted by the timer IC 160 to turn on the FET 510. Thus, the operation of the vibrating compressor 4 is resumed.

FIG. 23 shows the construction of still another embodiment of this invention.

The embodiment shown in FIG. 23 is based on the fact that a vibrating compressor can be driven under the optimum conditions by causing the vibrating period of the electrical vibrating system in a vibrating compressor to agree with the natural frequency (resonance frequency) of the mechanical vibrating system (Japanese Published Unexamined Patent Application Sho-61(1986)-173676), that when the frequency of the driving voltage applied to the vibrating compressor is the optimum frequency, the peaks of the preceding and succeeding halves of a half-period current waveform flowing in the vibrating compressor becomes almost equal, and has such a construction that the vibrating compressor is driven by causing an inverter to generate an a-c current of a frequency agreeing with the resonance frequency of the vibrating compressor by using a holding curve of the peak of the preceding half of the current waveform and an integration curve of the half-period current wave form and effecting control to forcibly reverse a switching element at a timing at which both curves intersect with each other so that the peaks of the preceding and succeeding halves of the half-period current waveform agree with each other.

In the figure, the vibrating compressor 4, the inverter 5, and the shunt resistor 301 are the same as used in the embodiment shown in FIG. 4. Description of them is therefore omitted here.

A d-c power source 630 is a drive power source for the vibrating compressor 4, and at the same time serves as a power source for various other control circuits.

A pulse generating section 170 generates pulses for switching two FETs 503 and 504 in the inverter 5; the oscillation period of the output pulses thereof being variable with the input of an external trigger.

A pulse forced reversing circuit 171 has a peak holding circuit 172 for holding the peak of the current waveform flowing in the shunt resistor 301 at every half-period of the current waveform, and an integration circuit 173 for integrating the half-period current waveform. Each time constant of the peak holding circuit 172 and the integration circuit 173 is selected in advance so that the peaks of the preceding and succeeding halves of the half-period of the current waveform agree with each other at an intersecting point of the holding curve of the peak holding circuit 172 and the integration curve of the integration circuit 173. When the holding curve of the peak holding circuit 172 agrees with the integration curve of the integration circuit 173, a trigger signal is generated to forcibly reverse the output pulses of the pulse generating section 170. The operation will be described in more detail in the following, referring to FIG. 24.

A drive circuit 230 exerts control based on the pulses generated by the pulse generating section 170 so that the FETs 503 and 504 of the inverter 5 are alternately turned on.

FIG. 24a and 24b are diagrams of assistance in explaining the timing waveform for generating a pulse forced reversing trigger signal.

In FIG. 24a, an upper solid line A is a reversed current waveform after the current of the vibrating compressor 4 flowing in the shunt resistor 301 when the FET 504 is turned on has been amplified appropriately. A dotted line B is a discharge current waveform in which the current waveform is discharged at a predetermined time constant after the peak of the preceding half has been held. An alternate long and short dash line C is an integrated current waveform obtained when the reversed current waveform A after the current of the vibrating compressor 4 has bee amplified appropriately is integrated. A lower solid line D is a trigger waveform showing the timing at which the trigger signal is generated.

As described above, the vibrating compressor 4 is driven at the maximum efficiency when the vibrating period of the electrical vibrating system on the power source side is caused to agree with the natural vibrating period of the mechanical vibrating system of the vibrating compressor 4, and when the vibrating compressor 4 is driven at the maximum efficiency, the peaks of the preceding and succeeding halves of the half-period of the current waveform becomes almost equal.

An experiment is conducted in advance to cause the discharge current waveform, that is, the holding curve, of the peak holding circuit 172, which holds the peak value in the preceding half of the half-period of the current waveform, and then discharge at a predetermined time constant, to intersect the integrated current waveform, that is, the integration curve, of the integration circuit 173 when the current waveform is integrated at a predetermined time constant, and to set each time constant of the peak holding circuit 172 and the integration circuit 173 so that the intersecting timing agrees with the timing of the peak of the succeeding half of the half-period of the current waveform. The vibrating period of the electrical vibrating system on the power source side can be caused to agree with the natural frequency of the mechanical vibrating system of the vibrating compressor 4 by forcibly terminating the period of the electrical vibrating system at the timing at which this intersecting point is generated, and starting the next period. A trigger signal as shown by the lower solid line D is FIG. 24b is generated at the timing at which the intersecting point is generated.

Next, the operation of the power supply for vibrating compressors of this invention having the aforementioned construction will be described in the following.

The pulse generating section 170 has a timer IC 160 (NE555, for example) that operates as an astable multivibrator. The ON-OFF time of the pulses outputted from Pin No. 3 is determined by the resistors R1 and R2, and the capacitor C1 connected to Pin Nos. 6 and 7, as shown in the figure, and normally expressed by the ON time T1=0.693 (R1+R2)·C1, and the OFF time T2=0.693·R2·C1. In this invention, the resistor R2 is selected to have a smaller resistance than that of the resistor R1 so that pulses of a duty ratio of 50% can be oscillated.

To oscillate pulses of a duty ratio of 50%, the frequency of the pulses generated by the timer IC 160 may be doubled, and then halved in the flip-flop circuit.

To Pin No. 5 of the timer IC 160 connected is the pulse forced reversing circuit 171. As will be described later, the OFF (L) output on Pin No. 3 is forcibly reversed to ON (H) by a trigger signal outputted by the pulse forced reversing circuit 171 at the timing described referring to FIG. 24.

In the following, description will be made referring to FIGS. 25a–25h which is a time chart of assistance in explaining the operation of the embodiment.

When the output pulse on Pin No. 3 of the timer IC 160 becomes H (FIG. 25a), the transistor TR1 in the drive circuit 230 is turned on, causing the transistors TR2 and TR3 at the next stage to be turned on (FIG. 25c). As the transistor TR3 is turned on, on the other hand, the FET 503 is turned off (FIG. 25b). Consequently, −12 V of the d-c power source 630 is fed to the vibrating compressor 4 via the FET 504.

The optimum time during which voltage is applied to the vibrating compressor 4, which is empirically predetermined by the construction of the vibrating compressor 4, is set as the ON time.

As the ON time is elapsed, the output pulses on Pin No. 3 of the timer IC 160 become L (FIG. 25a), and conversely the FET 503 is turned on and the FET 504 is turned off (FIG. 25b) and 25c).

In this way, the FETs 503 and 504 are alternately reversed at every period of the pulses outputted by the timer IC 160, and an a-c voltage is generated by the inverter 5 in accordance with the oscillation frequency of the timer IC 160. 50 Hz, for example, is used as this oscillation frequency.

As a current flowing in the vibrating compressor 4 is detected by the shunt resistor 301 (FIG. 25d), the current detected by the shunt resistor 301 is amplified appropriately by the operational amplifier 174 in the pulse forced reversing circuit 171, and only the negative current component is reversed and acquired (FIG. 25e). This current is inputted to the peak holding circuit 172 and the integration circuit 173.

In the peak holding circuit 172, the above current is divided by the resistors R3 and R4, and the peak of the current divided by the resistors R3 and R4 is detected and held by the diode D2, the capacitor C2 and the resistor R5. After the peak of this current waveform has been detected, the charge in the capacitor C2 is discharged by the time constant C2·R5 of the capacitor C2 and the resistor R5 with the passage of time in accordance with the holding curve as described in FIG. 24 (FIG. 25g).

The current waveform outputted from the operational amplifier 174 inputted to the integration circuit 173 charged the capacitor C3 in accordance with the integration curve described in FIG. 24 with the passage of time by the time constant C3·R6 of the capacitor C3 and the resistor R6 (FIG. 25f).

The discharged voltage discharged in accordance with the holding curve of the peak holding circuit 172 is compared with the charged voltage charged in accordance with the integration curve of the integration circuit 173 by the operational amplifier 175. As the discharged voltage of the peak holding circuit 172 is about to become lower than the charged voltage of the integration circuit 173, that is, as the charged voltage X of the integration curve of the integration circuit 172 slightly exceeds the discharged voltage E of the holding curve of the peak holding circuit 172, the output of the operational amplifier 175 is reversed from H to L, and reversed again from L to H immediately after that, as will be described later. That is, a trigger signal is generated by the pulse forced reversing circuit 171 (FIG. 25h).

This trigger signal is inputted to Pin No. 5 of the timer IC 160. Since the voltage on Pin No. 5 of the timer IC 160 serves as the input to control the ON time T1 of pulses outputted from Pin No. 3, the voltage inputted to Pin No. 5 is compared with the charged voltage of the capacitor C1 on Pin No. 6. When the voltage on Pin No. 5 is lower than the voltage on Pin No. 6, control is effected to reverse the output pulses on Pin No. 3. The voltage on Pin No. 5 is normally set at ⅔ of the power voltage $V_{cc}$, and is higher than the charged voltage of the capacitor C1 inputted to Pin No. 6 (FIG. 25i). As shown in FIG. 25i, however, the voltage on Pin No. 5 becomes lower than the charged voltage in the capacitor C1 on Pin No. 6. As a result, the output pulses on Pin No. 3 is forcibly reversed from H to L at that timing. That is, the ON time T1 on Pin No. 3 is forcibly terminated, and the OFF time T2 is started (FIG. 25a).

With the start of the OFF time T2, the FETs 503 and 504 are reversed, and a +12-V voltage is applied to the vibrating compressor 4 via the FET 503. At this time, the positive current flowing in the vibrating compressor 4 is detected by the shunt resistor 301, but this positive current is cut by the operational amplifier 174 of the pulse forced reversing circuit 171. During this OFF time T2, therefore, the charged voltage of the integration circuit 173 comes to be discharged, and as a result the charged voltage becomes lower than the discharged voltage of the peak holding circuit 172. Thus, the operational amplifier 15 is reversed from L to H immediately after the start of the OFF time T2. Consequently, a trigger signal as shown in FIG. 25h and i is generated.

At this time, the OFF time T2 becomes shorter than the above-mentioned T2=0.693·R1·C1 because the OFF time T2 starts at a voltage lower than (⅔)$V_{cc}$, but an almost constant OFF time can be obtained. The value of the OFF time T2 in this invention is determined, taking into account this fact that it becomes shorter.

The levels of (⅓)$V_{cc}$ and (⅔)$V_{cc}$ shown in FIG. 25 (9) represent the levels at which the ON time and the OFF time are started on Pin No. 3 when Pin No. 5 is not used, and the charged voltage charged in the capacitor C1 on Pin No. 6 reaches this level.

In this way, the start of the OFF time T2 of the output pulses oscillated on Pin No. 3 of the timer IC 160 is forcibly changed by the trigger signal outputted by the pulse forced reversing circuit 171, and synchronized with the vibrating period of the vibrating compressor 4. That is, the vibrating period of the electrical vibrating system can be caused to agree with the natural vibrating period of the mechanical vibrating system of the vibrating compressor 4, and the vibrating compressor 4 can be driven at the maximum efficiency.

Although the timer IC 160 is used in the pulse generating section 170 in the foregoing description, other circuits for reversing output pulses by a trigger signal, such as a monostable multivibrator consisting of components other than the timer IC, can be used.

As described above, this invention makes it possible to provide a power supply for vibrating compressors that can generate an a-c voltage of a frequency following changes in the resonance frequency of the vibrating compressor. With this invention, therefore, the vibrating compressor can be driven at the maximum efficiency, and when a d-c power source, such as a battery, is used, power consumption in the battery and the load on an automobile can be reduced.

Having a polarity reversing circuit, this invention can eliminate two positive and negative power sources, and a car battery can be used as the power source by tapping from a cigarette-lighter plug.

Having an a-c/d-c automatic converter, this invention can use a commercial a-c power wherever available, reducing the load on the car battery.

Furthermore, this invention can protect the battery and save power because when the d-c voltage becomes higher and the ambient temperature of the refrigerator becomes lower, control is exerted to keep the voltage fed to the vibrating compressor low, preventing the valve hitting phenomenon of the vibrating compressor and improving the durability of the vibrating compressor.

Since MOS-FET can be used in this invention, high power can be supplied without the fear of the breakdown of switching elements.

This invention makes it possible to provide a frequency following circuit that can generate a frequency following the resonance frequency of the vibrating compressor that changes with changes in load and service environment.

What is claimed is:

1. A power supply for vibrating compressors having an inverter for converting d-c into a-c comprising:

a d-c power source section for applying d-c voltage to said inverter;

current detecting means for detecting a current flowing in a vibrating compressor; and a control section having a frequency following circuit for generating a frequency following a resonance frequency of said vibrating compressor based on a comparison of the detected current detected by said current detecting means in preceding and succeeding periods and an inverter control circuit for controlling said inverter at said frequency generated by said frequency following circuit to cause the vibrating compressor to be driven by an a-c voltage of a frequency agreeing with the resonance frequency of said vibrating compressor.

2. A power supply for vibrating compressors as claimed in claim 1 wherein said d-c power source section comprises a polarity reversing circuit for reversing the polarity of d-c voltage.

3. A power supply for vibrating compressors as claimed in claim 2 wherein said polarity reversing circuit comprises a pulse generating circuit for generating pulses, a switching circuit for performing switching operation based on pulses generated by said pulse generating circuit, a choke coil for accumulating electromagnetic energy by the switching operation of said switching circuit, and a series circuit of a diode and a capacitor connected in parallel with said choke coil;

a voltage of a reversed polarity being obtained at a connecting point of said diode and said capacitor.

4. A power supply for vibrating compressors as claimed in claim 3 wherein said switching circuit comprises an N-channel MOS-FET, and a charge pump circuit for charging a capacitor via a diode and discharging charged voltage in said capacitor via a resistor; said charge pump circuit being connected between the gate and source of said N-channel MOS-FET.

5. A power supply for vibrating compressors as claimed in claim 1 wherein said d-c power source section comprises an a-c/d-c automatic converter.

6. A power supply for vibrating compressors as claimed in claim 1, wherein an a-c/d-c automatic converter comprises:

a cigarette-lighter plug connected to a cigarette-lighter receptacle of an automobile;

an output terminal for outputting a voltage of an automobile battery connected to said cigarette-lighter plug via normally-closed relay contact;

an a-c receptacle connected to a commercial power source;

a switching power source for converting a commercial power connected to said a-c receptacle into a d-c voltage of the same potential as that of said battery voltage, and outputting said d-c voltage to said output terminal; and a relay drive circuit for rectifying a secondary voltage of a transformer of said switching power source when a commercial power source is connected to said a-c receptacle, and opening said normally-closed relay contact to supply the d-c voltage of said switching power source in preference to the d-c voltage of said battery.

7. A power supply for vibrating compressors as claimed in claim 1, wherein said control section comprises:

a battery monitor circuit that is used, when a battery is connected to said d-c power source section, for monitoring a voltage drop in said battery, and when the voltage of said battery falls below a predetermined voltage, stopping the application of d-c voltage from said d-c power source section to said inverter and the operation of said frequency following circuit of said control section.

8. A power supply for vibrating compressors as claimed in claim 1 wherein said inverter comprises two switching elements;

said frequency following circuit of said control section comprises a variable oscillator for oscillating pulses whose frequency can be changed, a changeover circuit that is used, based on an oscillation frequency generated by said variable oscillator, for changing over a current flowing in said current detecting means at every half-period of one period of said oscillation frequency generated by said variable oscillator, two peak holding circuits for detecting and holding the peak value of a current flowing in said current detecting means during a changeover period of said changeover circuit, and an arithmetic circuit for comparing both peak values held by said two peak holding circuits, and controlling so as to change an oscillation frequency of said variable oscillator so that a difference between both peak values becomes a predetermined value; said inverter control circuit of said control section comprises a frequency divider for halving an oscillation frequency of said variable oscillator, and a switching element control circuit for alternately switching said two switching elements by a frequency divided by said frequency divider.

9. A power supply for vibrating compressors as claimed in claim 1 wherein said inverter comprises two switching elements; said frequency following circuit of said control section comprises a variable oscillator for oscillating pulses whose frequency can be changed, a period dividing circuit that is used, based on an oscillation frequency of said variable oscillator, for dividing one period of an oscillation frequency generated by said variable oscillator into a predetermined ratio where preceding time is longer than a succeeding time, electronic switches for acquiring current waveforms flowing in said current detecting means at every said preceding and succeeding time outputted by said period dividing circuit, a peak detecting circuit for detecting the maximum peaks of said current waveforms acquired by said electronic switches, and an error amplifying circuit for comparing two peaks detected by said peak detecting circuits, and changing said oscillation frequency generated by said variable oscillator in accordance with a difference between said two peaks; and said inverter control circuit of said control section comprises a frequency divider for halving an oscillation frequency of said variable oscillator, and a switching element control circuit for alternately switching said two switching elements by a frequency divided by said frequency divider.

10. A power supply for vibrating compressors as claimed in claim 1 wherein said inverter comprises two switching elements; said frequency following circuit of said control section comprises a variable oscillator for oscillating pulses whose frequency can be changed, electronic switches that are used, based on an oscillation frequency of said variable oscillator, for acquiring current waveforms flowing in said current detecting means at every half-period of one period of said oscillation frequency generated by said variable oscillator, two mean value circuits for averaging the current values of current waveforms acquired by said electronic switches, and an arithmetic circuit for comparing both mean values averaged in said two mean value circuits, and controlling so as to change an oscillation frequency of said variable oscillator so that a difference between both mean values becomes a predetermined value; said inverter control circuit of said control section comprises a frequency divider for halving an oscillation frequency of said variable oscillator, and a switching element control circuit for alternately switching said two switching elements by a frequency divided by said frequency divider.

11. A power supply for vibrating compressors as claimed in claim 1 wherein said inverter comprises two switching elements; said frequency following circuit of said control section comprises a variable oscillator for oscillating pulses whose frequency can be changed, electronic switches that are used, based on an oscillation frequency of said variable oscillator, for acquiring current waveforms flowing in said current detecting means at every half-period of one period of said oscillation frequency generated by said variable oscillator, two integration circuits for integrating current waveforms acquired by said electronic switches, and an arithmetic circuit for comparing both integrated values integrated in said two integration circuits, and controlling so as to change an oscillation frequency of said variable oscillator so that a difference between both integrated values becomes a predetermined value; and said inverter control circuit of said control section comprises a frequency divider for halving an oscillation frequency of said variable oscillator, and a switching element control circuit for alternately switching said two switching elements by a frequency divided by said frequency divider.

12. A power supply for vibrating compressors as claimed in claim 1 wherein said inverter comprises two switching elements; said frequency following circuit of said control section comprises a variable oscillator for oscillating pulses whose frequency can be changed, a mean value circuit for averaging currents flowing in said vibrating compressor detected by said current detecting means, electronic switches that are used, based on an oscillation frequency of said variable oscillator, for acquiring current waveforms flowing in said current detecting means at every half-period of one period of said oscillation frequency generated by said variable oscillator, and a minimum current control circuit for obtaining the minimum mean current by gradually changing an oscillation frequency of said variable oscillator at intervals of a predetermined time and comparing two mean values acquired by said electronic switches, and controlling to change said oscillation frequency of said variable oscillator so that a mean current become minimum; and said inverter control circuit of said control section comprises a switching element control circuit for alternately switching said two switching elements.

13. A power supply for vibrating compressors as claimed in claim 8, wherein said two switching elements of said inverter comprises two N-channel MOS-FETs each driven by positive and negative power sources; said switching element control circuit for alternately switching said two switching elements connects a charge pump circuit for charging a capacitor via a diode and discharging the voltage charged in said capacitor via a resistor between the gate and source of said N-channel MOS-FET driven by said positive power source; and the anode of a diode of said charge pump circuit is connected to the ground.

14. A power supply for vibrating compressors as claimed in claim 8, wherein said control section comprises:

a high-voltage protection circuit for monitoring d-c voltage of said d-c power source section and changing the width of pulses generated by said variable oscillator when said d-c voltage rises above a predetermined voltage.

15. A power supply for vibrating compressors as claimed in claim 8, wherein said control section comprises:

a high-voltage protection circuit for monitoring d-c voltage of said d-c power source section and changing the width of pulses generated by said variable oscillator in accordance with said d-c voltage.

16. A power supply for vibrating compressors as claimed in claim 1 wherein said inverter comprises a switching element; said frequency following circuit of said control section comprises a pulse generating section for generating pulses for switching said switching element, and a pulse forced reversing circuit for forcibly reversing output of said pulse generating section at a timing at which a counter electromotive force generated by said vibrating compressor during OFF time of said switching element is recovered in the vicinity of 0 V, and the output of said pulse generating section is forcibly reversed at that timing; and said inverter control circuit of said control section comprises a driver for driving said switching element based on output of said pulse generating section.

17. A power supply for vibrating compressors as claimed in claim 1 wherein said inverter comprises two switching elements; said frequency following circuit of said control section comprises a pulse generating section for generating pulses for switching said switching elements, a peak holding circuit for holding peaks of current waveforms flowing in said current detecting means at every half-period of said current waveforms, an integration circuit for integrating current waveforms for said half-periods, and a pulse forced reversing circuit for selecting in advance each time constant for said peak holding circuit and said integration circuit so that preceding and succeeding peaks in a half-period of said current waveforms agree with each other at a point at which a holding curve of said peak holding circuit intersects an integration curve of said integration circuit, and forcibly reversing pulses outputted by said pulse generating section when said holding curve of said peak holding circuit agrees with said integration curve of said integration circuit; and said inverter control circuit of said control section comprises a drive circuit for driving said switching elements based on pulses generated by said pulse generating section.

18. A power supply for vibrating compressors as claimed in claim 1, wherein:

said control section includes a thermal control circuit that is used for controlling a temperature inside a refrigerator, and when the temperature inside said refrigerator rises above a preset temperature, stopping an application of d-c voltage from said d-c power source to said inverter and for stopping operation of said frequency following circuit of said control section.

19. A power supply for vibrating compressors as claimed in claim 8, wherein:

said control section includes a low ambient temperature protection circuit for monitoring an ambient temperature of a refrigerator and for changing the width of pulses generated by said variable oscillator when the ambient temperature falls below a predetermined temperature and to prevent a valve hitting phenomenon in the vibrating compressor.

20. A power supply for vibrating compressors as claimed in claim 15, wherein:

said control section includes a low ambient temperature protection circuit for monitoring an ambient temperature of a refrigerator and for changing the width of pulses generated by said variable oscillator when the ambient temperature falls below a predetermined temperature and to prevent a valve hitting phenomenon in the vibrating compressor.

21. A power supply for a vibrating compressor, the power supply comprising:

inverter means for creating a variable a-c voltage and supplying said a-c voltage to the compressor;

current detecting means for detecting a current flowing through the compressor;

control means connected to said current detecting means and for determining a resonance frequency of the compressor based on a comparison of said current detected by said detecting means in preceding and succeeding periods, said control means being connected to said inverter means and controlling said inverter means to create said a-c voltage at a frequency substantially similar to said resonance frequency.

22. A power supply in accordance with claim 21, wherein:

said control means repetitively determines said resonance frequency during operation of the compressor.

23. A power supply in accordance with claim 22, wherein:

said control means varies said frequency of said a-c voltage to follow said resonance frequency.

24. A power supply in accordance with claim 21, wherein:

said control means analyzes said current and compares peaks in said current to determine said resonance frequency.

25. A power supply in accordance with claim 24, wherein:

said peaks are sequential.

26. A power supply in accordance with claim 24, wherein:

said peaks are first and second peaks occurring during a half of a cycle of said a-c voltage.

27. A power supply in accordance with claim 26, wherein:

said half of said cycle is one of a positive and negative portion.

* * * * *